US011133956B2

(12) United States Patent
Tulliano et al.

(10) Patent No.: US 11,133,956 B2
(45) Date of Patent: *Sep. 28, 2021

(54) AUTHENTICATION SYSTEMS AND METHODS FOR CONTROLLERS

(71) Applicant: Hunter Industries, Inc., San Marcos, CA (US)

(72) Inventors: Vicente Tulliano, La Mesa, CA (US); Dexter Baga, San Diego, CA (US); Charlotte A. Wilson, Gardnerville, NV (US); Dustin R. Franklin, San Marcos, CA (US); Lynn Langit, Aliso Viejo, CA (US); Jason Lin, San Marcos, CA (US); Christopher Karady Scripca Lucian, San Marcos, CA (US); Christian M. Stead, Carlsbad, CA (US)

(73) Assignee: Hunter Industries, Inc., San Marcos, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/551,238

(22) Filed: Aug. 26, 2019

(65) Prior Publication Data

US 2019/0379554 A1 Dec. 12, 2019

Related U.S. Application Data

(63) Continuation of application No. 15/493,644, filed on Apr. 21, 2017, now Pat. No. 10,425,248.

(Continued)

(51) Int. Cl.
*H04L 12/28* (2006.01)
*G08C 17/00* (2006.01)
(Continued)

(52) U.S. Cl.
CPC ............ *H04L 12/283* (2013.01); *G08C 17/00* (2013.01); *H04L 12/2818* (2013.01);
(Continued)

(58) Field of Classification Search
CPC ............... H04L 12/283; H04L 12/2818; H04L 29/08099; H04L 63/0853; H04M 1/72415
See application file for complete search history.

(56) References Cited

U.S. PATENT DOCUMENTS

| | | | |
|---|---|---|---|
| 7,711,796 B2 * | 5/2010 | Gutt | H04L 41/0803 709/217 |
| 2009/0177882 A1 * | 7/2009 | Saran | H04W 12/126 713/159 |

(Continued)

*Primary Examiner* — Ali S Abyaneh
(74) *Attorney, Agent, or Firm* — Knobbe, Martens, Olson & Bear, LLP

(57) ABSTRACT

Systems and methods to authenticate a controller having a user interface with a manually actionable control include randomly selecting a first position of the plurality of positions of the manually actuable control, prompting a user to position the manually actionable control to the randomly selected position, receiving an indication of the present position of the manually actionable control, comparing the indication of the randomly selected position with the indication of the present position, and authenticating the controller when the indication of the randomly selected position matches the indication of the present position.

24 Claims, 36 Drawing Sheets

Related U.S. Application Data

(60) Provisional application No. 62/327,768, filed on Apr. 26, 2016.

(51) Int. Cl.
    *H04L 29/06*     (2006.01)
    *H04L 29/08*     (2006.01)
    *H04M 1/72415*     (2021.01)

(52) U.S. Cl.
    CPC .......... *H04L 63/0853* (2013.01); *H04L 67/02* (2013.01); *H04M 1/72415* (2021.01); *G08C 2201/91* (2013.01); *H04L 2012/2843* (2013.01)

(56) References Cited

U.S. PATENT DOCUMENTS

| | | | | |
|---|---|---|---|---|
| 2011/0154444 | A1* | 6/2011 | Sriraghavan | G06F 3/04883 726/4 |
| 2011/0202195 | A1* | 8/2011 | Finch | G06Q 10/06 700/295 |
| 2016/0149767 | A1* | 5/2016 | Britt | G06Q 30/0641 715/727 |
| 2016/0195864 | A1* | 7/2016 | Kim | H04L 12/2816 709/221 |
| 2016/0234186 | A1* | 8/2016 | Leblond | H04L 63/08 |
| 2017/0248440 | A1* | 8/2017 | Nishimura | G01C 21/26 |
| 2017/0257359 | A1* | 9/2017 | Ogawa | H04L 63/0853 |
| 2017/0311159 | A1 | 10/2017 | Tuliano | |
| 2019/0041818 | A1* | 2/2019 | Tomono | H04L 12/283 |

\* cited by examiner

Hunter *Web Central*

ADD CONTROLLER

CONTROLLER

OWNERSHIP

Please enter the following information for 0123345

○ I am the owner

● I am managing this controller

● I am setting up this controller for someone else

< PREV    NEXT >

FIG. 32

AUTHENTICATION SYSTEMS AND METHODS FOR CONTROLLERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

The ability of devices to internetwork provides an opportunity for unauthorized control of the devices.

SUMMARY

An interface module interfaces a controller to a cloud-based server through an Ethernet or Wi-Fi connection. In an embodiment, the controller comprises the interface module. This allows a user to control a landscape system from a remote location using the user's Internet-compatible device without specific software installed. For security, the user is authenticated and authorized to prevent others from controlling the controller.

In some embodiments, the cloud-based server sends authentication information that is displayed on the controller's display. The user reads the authentication information from the display and sends the authentication information to the cloud-based server via the user's Internet-compatible device. The cloud-based server authenticates and authorizes the user when the valid authentication information is received.

In other embodiments, the controller does not include a display that is capable of displaying the authentication information from the cloud-based server. For controllers without a display or without a display capable of displaying authentication information from the cloud-based server, the user is authorized by the cloud-based server after the user completes a series of instructions to set switches or dials on the controller or any other user selectable input. The user's Internet-compatible device receives instructions to set controller switches or dials to one or more positions randomly selected by the cloud-based server. The controller transmits the dial or switch position information to the cloud-based server and the cloud-based server authenticates and authorizes the user when the one or more instructions to set the switches or dials have been correctly implemented.

According to some implementations, a system to authenticate a controller comprises a controller that is configured to communicate over the Internet, where the controller comprises a user interface with at least one manually actionable control that is configured to be manually placed in a plurality of positions; a web server comprising at least one computer processor and memory storing an indication for each position of the plurality of positions of the at least one manually actionable control; and a web enabled device different from the controller, where the web enabled device is configured to display prompts to a user from the web server. The web server is configured to randomly select a first position of the plurality of positions of the at least one manually actuable control of the controller, prompt the user via the web enabled device to position the at least one manually actionable control to the randomly selected position, request an indication of the present position of the at least one manually actionable control from the controller after prompting the user, receive the indication of the present position of the at least one manually actionable control from the controller, compare an indication of the randomly selected position with the indication of the present position, and authenticate the controller when the indication of the randomly selected position matches the indication of the present position.

In an embodiment, the controller comprises an irrigation controller, a lighting controller, or a landscape controller. In another embodiment, the controller is without a display that is responsive to the web server. In a further embodiment, the web server is further configured to receive an acknowledgement from the user via the web enabled device that the at least one manually actionable control is positioned to the randomly selected position. In a yet further embodiment, the web server is further configured to request the indication of the present position of the at least one manually actionable control from the controller within a predetermined amount of time after prompting the user.

In an embodiment, the web server is further configured to notify the user via the web enabled device that the controller is authenticated when the indication of the randomly selected position matches the indication of the present position. In another embodiment, the web server is further configured to receive information identifying the controller from the user via the web enabled device.

In an embodiment, the controller further comprises at least one computer processor, memory storing a watering schedule, and a plurality of switches in communication with the at least one computer processor of the controller to operate a plurality of valves that deliver water to a plurality of sprinklers based at least in part on the watering schedule. In another embodiment, the controller further comprises at least one computer processor, memory storing a lighting schedule, and a plurality of switches in communication with the at least one computer processor of the controller to operate a plurality of lighting devices based at least in part on the lighting schedule. In some embodiments, the web enabled device comprises a smart phone.

In some implementations, a method to authenticate a controller that is configured to communicate over the Internet, where the controller comprises a user interface with at least one manually actionable control that is configured to be manually placed in a plurality of positions, is disclosed. The method comprises randomly selecting, with a web server, a first position of the plurality of positions of the manually actuable control, where the web server comprises at least one computer processor and memory storing an indication for each position of the plurality of positions of the at least one manually actionable control; prompting, with the web server, a user via a web enabled device to position the at least one manually actionable control on the controller to the first randomly selected position, where the web enabled device is different from the controller; requesting, with the web server, an indication of the first present position of the at least one manually actionable control from the controller after prompting the user to position the at least one manually actionable control on the controller to the first randomly selected position; receiving, with the web server, the indication of the first present position of the at least one manually actionable control from the controller; comparing, with the web server, an indication of the first randomly selected position with the indication of the first present position; and authenticating, with the web server, the controller when the indication of the first randomly selected position matches the indication of the first present position.

In an embodiment, the method further comprises starting, with the web server, a timer when the user is prompted to position the at least one manually actionable control on the controller to the first randomly selected position. In another embodiment, the method further comprises requesting, with the web server, the indication of the present position of the at least one manually actionable control from the controller within a predetermined amount of time after prompting the user. In a further embodiment, the method further comprises notifying, with the web server, the user via the web enabled device that the controller is authenticated when the indication of the randomly selected position matches the indication of the present position.

In some implementations, a system to authenticate a controller comprises a controller that is configured to communicate over the Internet, where the controller comprises a user interface with at least one manually actionable control that is configured to be manually placed in a plurality of positions; a web server comprising at least one computer processor and memory storing an indication for each position of the plurality of positions of the at least one manually actionable control; and a web enabled device different from the controller, where the web enabled device is configured to display prompts to a user from the web server. The web server is configured to randomly select a predetermined number of positions of the plurality of positions of the at least one manually actuable control of the controller. For each of the randomly selected positions, the web server is further configured to prompt the user via the web enabled device to position the at least one manually actionable control to the randomly selected position, request an indication of the present position of the at least one manually actionable control from the controller after prompting the user, receive the indication of the present position of the at least one manually actionable control from the controller, and compare an indication of the randomly selected position with the indication of the present position. The web server is further configured to authenticate the controller when the indication of the randomly selected position matches the indication of the present position for each of the randomly selected positions.

BRIEF DESCRIPTION OF THE DRAWINGS

FIGS. 26-33 are exemplary screen shots displayed to a user during user authentication, according to certain embodiments.

DETAILED DESCRIPTION

Cloud-Based Control Systems

Figure 1:
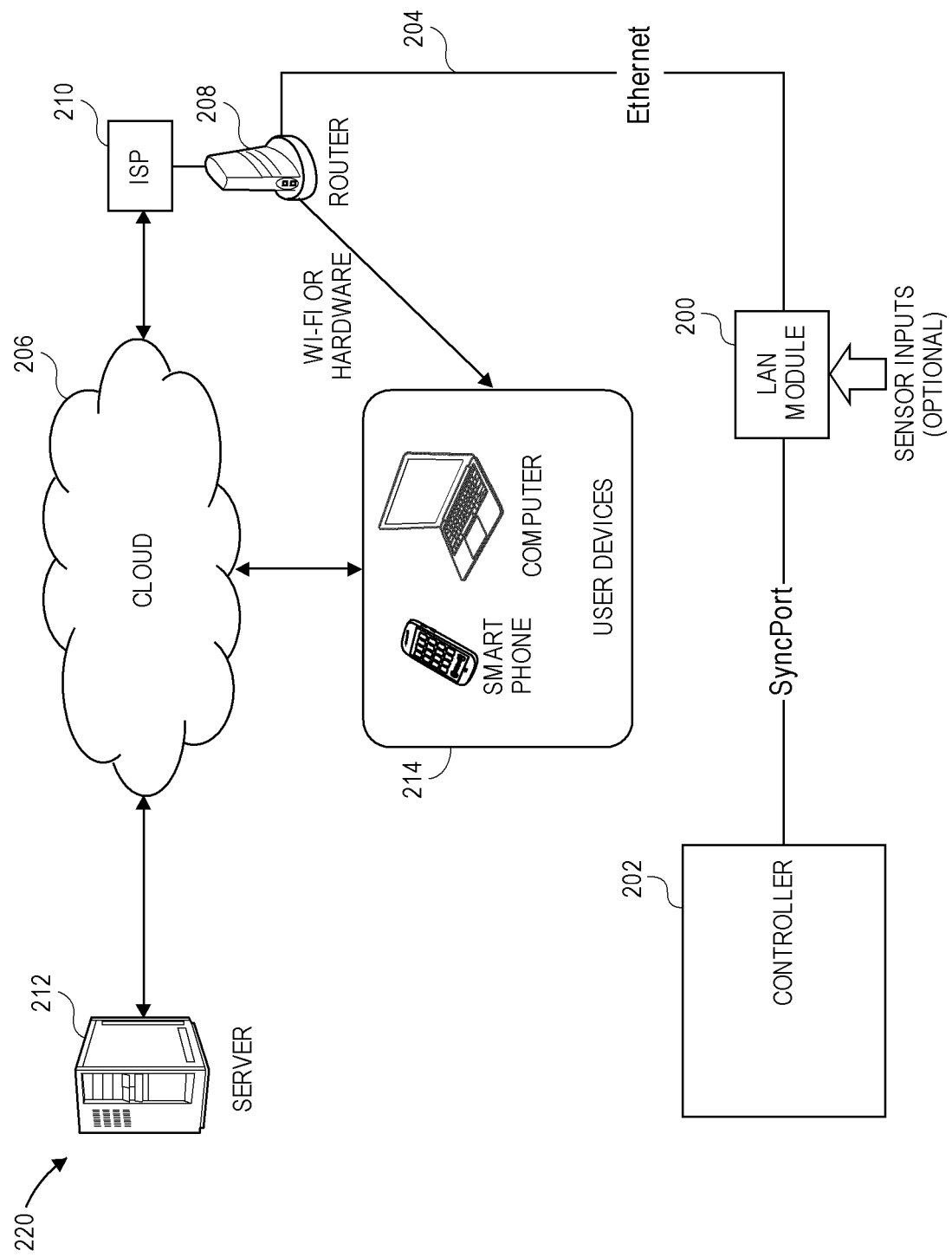
FIG. 1 illustrates a first system to remotely control a landscape controller, according to certain embodiments.

FIG. 1 illustrates a cloud-based control system 220, which comprises a server 212 communicating through the cloud or Internet 206 to various Internet-connected devices 214 including tablets, smart phones, computers, and the like, and a router 208, which provides communications between the devices 214 and a controller 202. The server 212 can serve up a web page that is accessible by the variety of Internet-connected devices 214. This allows a user who is able to connect to the Internet with a compatible device the ability to control a landscape system from a remote location without having specific software installed on the device. In an embodiment, the controller 202 comprises an irrigation controller configured to control irrigation valves. In another embodiment, the controller 202 comprises a lighting controller configured to control lighting fixtures. In a further embodiment, the controller 202 comprises a landscape controller configured to control sprinkler valves and lighting fixtures.

This service benefits property owners by permitting the property owners to manage their property remotely. Additionally, it is beneficial to a provider of irrigation, lighting, or landscape services to manage multiple accounts from a remote location. In an embodiment, different information is available to a single user than is available to a group user. In another embodiment, different information is available to a homeowner than is available to a professional maintenance person.

The server 212 receives information, such as schedule changes, alarms, and the like, from the controller 202. In an embodiment, the server 212 comprises a cloud-based server. In an embodiment, the server 212 retrieves weather and soil information, for example, from one or more of the interconnected devices. This information may come from the controller 202, from a weather station controller, or from a communications module. One common method for sharing information among multiple devices residing on the internet is Message Queuing Telemetry Transport or MQTT. MQTT is well documented and uses a broker with a publisher/subscriber model to share data.

The server 212 receives commands from the user, such as for example, change programming, shut down, provide status information, and the like, through the connected device. The server 212 provides information to the controller 202, such as, for example, schedule changes, and commands, such as manual start, resume normal operations, shut down, and the like.

In an embodiment, the server 212 provides information to the user via the served up web page, such as, for example, map locations of the property or properties being managed, alarm reports, current schedules, and other pertinent information that is useful to the user.

Embodiments disclose systems and methods to connect controllers to server-based central control software packages, which allow remote control and monitoring via Internet enabled devices. Other embodiments disclose systems and methods to connect the controller to an existing network, which has Internet access.

Landscape System with LAN Module for Cloud-Based Central Control

FIG. 1 illustrates the system 220 to remotely control the controller 202, according to an embodiment. The system 220 comprises the controller 202, such as the Pro-C® irrigation controller manufactured by Hunter Industries, Inc., connecting to a local area network (LAN) module 200 via a hardwire connection. The LAN module 200 connects to an Ethernet cable 204, which is connected to a local area network (LAN) that has Internet access. In FIG. 1, the Internet or cloud 206 is accessed via the router 208 that is connected to an Internet Service Provider (ISP) 210. The cloud-based server 212 hosts an application that provides an end user with control and monitoring capability of the controller 202 from the web-enabled user device 214 via its web browser, custom software, or a dedicated application. Although one controller 202 is illustrated in FIG. 1, in other embodiments multiple controllers 202 with multiple LAN modules 200 connect to a single LAN 200. In a further embodiment, when the connection between the LAN module 200 and the controller 202 supports a multi-drop network, multiple controllers 202 may be serviced by a single LAN module 200.

The LAN module 200 optionally comprises sensor input capability, and thereby shares the sensor status with one or more of the controller 202 and the server 212. This information may include, but is not limited to, flow rate, rain event, temperature, solar radiation, wind speed, relative humidity, motion, voltage, current, and soil moisture. In a further embodiment, the controller 202 comprises the sensor inputs and shares the sensor information with the server 212.

Communication between the controller 202 and the LAN module 200 may use a standard interface or a proprietary interface. Standard interfaces include, but are not limited to, RS232, RS485, Controller Area Network (CAN), USB, I2C, SPI, and the like. Proprietary interfaces include, but are not limited to, the SyncPort™ standard developed by Hunter Industries, Inc. In an embodiment, the LAN module 200 is located in proximity to the controller 202. In other embodiments, the LAN module 200 can be located far from the controller 202. The SyncPort™ is an optically isolated, balanced pair interface, which permits hundreds of feet of wire to connect the controller 202 with the LAN module 200. Other standards, such as RS485, permit thousands of feet of wire to connect the controller 202 with the LAN module 200.

In an embodiment, the controller 202 comprises the LAN module 200. In another embodiment, the LAN module circuitry is on the same printed circuit board as other controller circuitry and located within the controller 202. In an embodiment, power for the LAN module 200 is derived from the controller 202 via the SyncPort™. Power may also be supplied to the LAN module 200 by a separate power supply. In a further embodiment, the LAN module 200 may be powered using Power-over-Ethernet, which comprises a group of standards that allow an Ethernet connection to supply power as well as communications.

Figure 2:
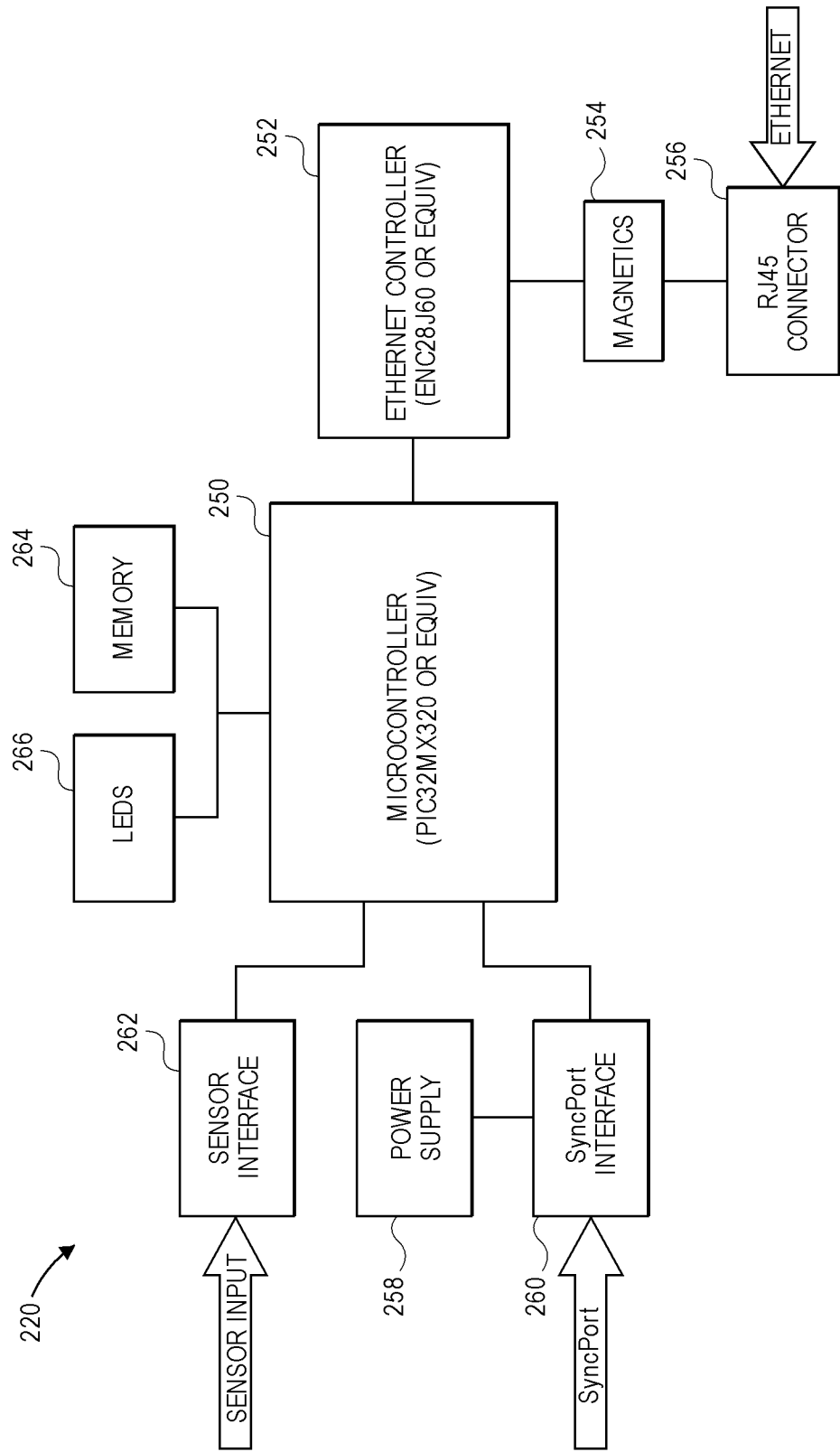
FIG. 2 is a block diagram of a LAN module shown in FIG. 1, according to certain embodiments.

FIG. 2 illustrates an embodiment of the LAN module 200 comprising a microcontroller 250, an Ethernet controller 252, transformer/magnetics 254, and a connector 256. The microcontroller 250 can be, for example, a PIC32MX320, manufactured by Microchip Technology of Chandler Ariz. or the like, and the Ethernet controller 252 can be, for example, an ENC28J60, manufactured by Microchip Technology of Chandler Ariz., or the like. The microcontroller 250 serves as a host and is in communication with the Ethernet controller 252. The Ethernet controller 252 communicates with the Local Area Network via a set of transformers or magnetics 254, which provide isolation, and the connector 256. In an embodiment, the connector 256 comprises a standard RJ45 connector.

The LAN module 200 further comprises a power supply 258, SyncPort™ interface circuitry 260, and sensor interface circuitry 262. The SyncPort™ supplies power to the LAN module 200. The SyncPort™ standard uses separate wires for power and communication. In an embodiment, a cable interfacing the SyncPort™ with the SyncPort™ interface circuitry 260 comprises the power wires and the communication wires. The power supply 258 regulates the unregulated "raw" voltage from the SyncPort™ power wires for use by the LAN module's logic circuitry, the SyncPort™ interface circuitry 260, and the sensor interface circuitry 262. In an embodiment, the logic supply voltage is approximately 3.3V, and the sensor interface circuitry 262 is powered by approximately 20-24 volts.

The SyncPort™ interface circuitry 260 receives the SyncPort™ communication signals, and interfaces them to the microcontroller 250. In an embodiment, the SyncPort™ interface circuitry 260 converts the SyncPort™ communication signals from differential signals to single ended signals, while also providing optical isolation.

The LAN module 250 further comprises memory 264. In an embodiment, the memory 264 comprises serial EEPROM and/or serial SPI Flash integrated circuits. In another embodiment, the microcontroller 250 comprises the memory 264. This memory 264, in an embodiment, is non-volatile and may serve several uses. For instance, if the firmware for the host microcontroller 250 inside the LAN module 200 needs to be updated (for instance from the server 212), then the updated firmware could first be loaded into the memory 264 and validated via checksum or the like, before being used to reprogram the host microcontroller 250.

The memory 264 could store sensor data. In an embodiment, the sensor interface circuitry 262 comprises a flow sensor interface, and for instance, the amount of water flowing during each minute of the day could be stored and later retrieved by the server 212. In another embodiment, the sensor interface circuitry 262 comprises a temperature sensor interface and, for example, temperature data could be stored in the memory 264. In yet another embodiment, the memory 264 could hold a webpage that could be served by the host microcontroller 250. This may be useful for commissioning (initial setup/registration) or diagnostics purposes.

The LAN module 200 further comprises one or more LEDs 266, which can provide status information. For instance, one LED 266 could reflect the connection status between the LAN module 200 and the controller 202. Another LED 266 could reflect the status of the connection between the LAN module 200 and the LAN. A third LED 266 could be used to reflect the status of the LAN's connection to the Internet 206 or the server 212. Such feedback could provide invaluable trouble-shooting assistance in the event the system 220 fails.

It should be noted that in the embodiment presented, a host microcontroller 250 was used inside the LAN module 200 because of the limited processing capability of the microcontrollers typically found inside irrigation/lighting/landscape controllers 202. In most cases, the controller's microcontroller does not have the processing power or memory to host the TCP/IP stack to interface to the LAN. However, in further embodiments, the microcontroller associated with the controller 202 would perform the additional functions and the LAN module 200 would comprise the Ethernet controller 252 for Ethernet communications.

Furthermore, other embodiments of the microcontroller 250 may comprise an Ethernet controller 252, which would eliminate the need for a separate integrated circuit. In yet further embodiments, the controller's microcontroller may comprise a built-in Ethernet controller 252 for a totally integrated solution.

Additionally, while the magnetics 254 and RJ45 connector 256 are shown in FIG. 2 as separate devices, the magnetics 254 may be housed inside the RJ45 connector shell.

Landscape System with Wi-Fi Module for Cloud-Based Central Control

Figure 3:
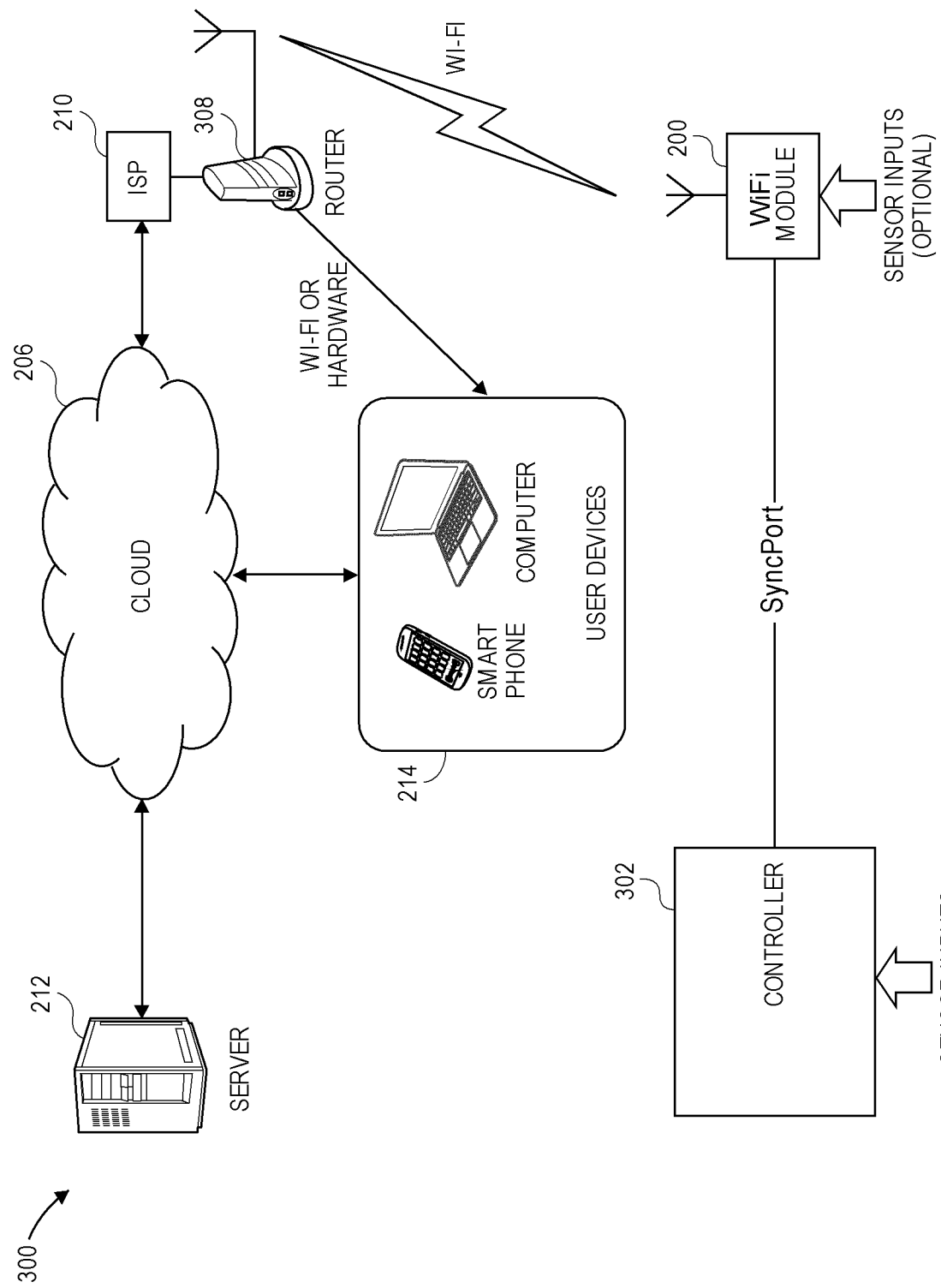
FIG. 3 illustrates a second system to remotely control a landscape controller, according to certain embodiments.

FIG. 3 illustrates a system 300 to remotely control a controller 302, according to another embodiment. The system 300 comprises the controller 302 and a Wi-Fi module 304, which connects the controller 302 to the LAN via a Wi-Fi connection. In an embodiment, the controller 302 comprises an irrigation controller configured to control irrigation valves. In another embodiment, the controller 302 comprises a lighting controller configured to control lighting fixtures. In a further embodiment, the controller 302 comprises a landscape controller configured to control sprinkler valves and lighting fixtures. The Internet or cloud 206 is accessed via a router 308 that is connected to the Internet Service Provider (ISP) 210. The cloud-based server 212 hosts an application that provides an end user with control and monitoring capability of the controller 302 from the web-enabled user device 214 via its web browser, custom software, or a dedicated application.

In an embodiment, multiple controllers 302 with multiple Wi-Fi modules 304 connect to a single LAN. In a further embodiment, multiple controllers 302 may be serviced by a single Wi-Fi module 304.

The Wi-Fi module 304 optionally comprises a sensor input capability, and thereby shares the sensor status with one or more of the controller 302 and the server 212. This information may include, but is not limited to, flow rate, rain event, temperature, solar radiation, wind speed, relative humidity, motion, voltage, current, and soil moisture.

Communication between the controller 302 and the Wi-Fi module 304 may use a standard interface or a proprietary interface. Standard interfaces include, but are not limited to RS232, RS485, Controller Area Network (CAN), USB, I2C, SPI, and the like. Proprietary interfaces include, but are not limited to the SyncPort™ standard developed by Hunter Industries. In an embodiment, the Wi-Fi module 304 is located in proximity to the controller 302. In other embodiments, the Wi-Fi module 304 can be located far from the controller 302. In another embodiment, the Wi-Fi module circuitry is on the same printed circuit board as other controller circuitry and located within the controller 302. In an embodiment, power for the Wi-Fi module 304 is derived from the controller 302 via the SyncPort™. Power may also be supplied to the Wi-Fi module 304 by a separate power supply.

Landscape Systems Using Power Line Communication for Cloud-Based Central Control FIGS. 4-10 relate to embodiments of a landscape system using power line communication for cloud-based central control. The systems illustrated in FIGS. 4, 6-10 use power line communication techniques to use existing AC wiring to communicate with an Ethernet to power line adapter. The Ethernet to power line adapter, via an Ethernet cable, operationally connects to a local area network (LAN) that has Internet access. The Internet (cloud) 206 is accessed via the router 210 that is connected to the Internet Service Provider (ISP) 210. The cloud based server 212 hosts an application that provides an end user with control and monitoring capability of the controller, from any web-enabled user device via its web browser, custom software, or a dedicated application.

In an embodiment, the controllers in FIGS. 4, 6-10 comprise irrigation controllers configured to one or more control irrigation valves. In another embodiment, the controllers in FIGS. 4, 6-10 comprise lighting controllers configured to control one or more lighting fixtures. In a further embodiment, the controllers in FIGS. 4, 6-10 comprise landscape controllers configured to control one or more sprinkler valves and/or one or more lighting fixtures.

Figure 4:
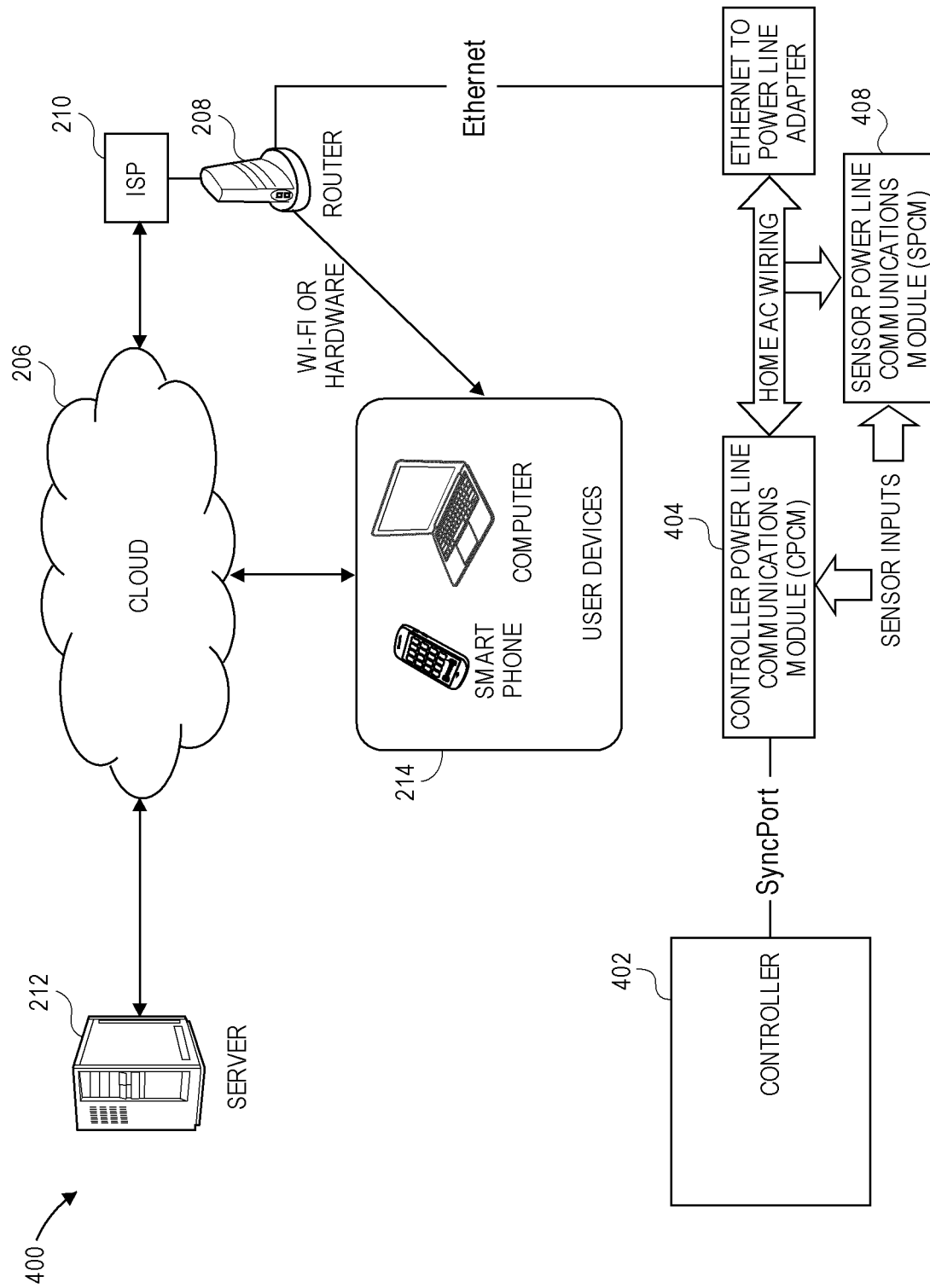
FIG. 4 illustrates an embodiment of a landscape system using power line communication to remotely control a landscape controller.

FIG. 4 illustrates an embodiment of a landscape system 400 using power line communications to remotely control a controller 402. The system 400 comprises the controller 402, a Controller Power Line Communication Module (CPCM) 404, and the Ethernet to power line adapter 406. In an embodiment, the controller 402 comprises a Pro-C® irrigation controller manufactured by Hunter Industries, Inc. The controller 402 connects to the CPCM 404 via a hardwire connection. The CPCM 404 uses power line communication techniques to use existing AC wiring to communicate with the Ethernet to power line adapter 406. In an embodiment, the controller 402 comprises the CPCM 404.

Although only one controller 402 is shown in FIG. 4, other embodiments of the system 400 comprise multiple controllers 402 with multiple CPCM's 404 connecting to a single or multiple Ethernet to power line adapters 406. In further embodiments, where the connection methods between the CPCM 404 and the controller 402 support a multi-drop network, multiple controllers 402 may be serviced by a single CPCM 404.

The CPCM 404 may optionally comprise sensor input capability, and thereby share sensor status with either the controller 402 or the server 212. The sensors comprise one or more of an evapotranspiration (ET) system, Solar Sync system, rain sensor, temperature sensor, soil moisture sensor, wind sensor, humidity sensor, ambient light sensor, or the like, in any combination. Furthermore, in another embodiment, the controller 402 comprises the sensor inputs and shares the sensor information with the server 212.

The system 400 of FIG. 4 further comprises one or more sensor power line communications modules (SPCM) 408. Sensors may operationally connect to the one or more SPCMs 408, which would share sensor information with the other power line communication devices. Advantageously, the SPCM 408 can be located close to the sensor, which may not be close to the controller 402 or to the CPCM 404. In an embodiment, the sensors may be connected to one or more of the sensor power line communications module (SPCM) 408, the controller power line communication module (CPCM) 404, and the controller 402.

An advantage to using power line communication techniques is that no special wiring needs to be run to any of the devices. In an embodiment, the controller 402 comprises the CPCM 404. Because the controllers utilize AC power, they inherently have access to the signals used for the power line communication. This provides a "seamless" installation where the installer simply connects the controller 402 to AC power as is normally done, and the connection to the power line network instantly exists.

Power line communications can take on many forms. This section is intended to give background information on this subject, and is not intended to describe the "only" way to accomplish power line communications.

Typically, power line communication systems superimpose a high frequency carrier signal onto a standard utility power signal. The high frequency carrier signal is a low-level signal when compared to the high-level power signal. The carrier signal may have a frequency ranging from approximately 20 kHz-30 kHz to over 1 MHz, which is significantly higher than the power line frequency of approximately 50 Hz or 60 Hz. Many of the devices to be powered are expecting a sinusoidal power signal of approximately 120 VAC or 230 VAC at approximately 50 Hz-60 Hz, depending on the power standards of the geographic area. Superimposing the high frequency carrier signal onto the power signal leaves the power signal essentially intact, and the devices operate normally. Typically, the communication signal is coupled onto the AC power line by capacitively coupling the output of a high-frequency isolation transformer to the AC power line. The power line communication network is bi-directional, and can transmit as well as receive a power line encoded message. In addition to providing isolation, the high-frequency isolation transformer provides some selectivity to accept signals in the frequency range of the carrier signal while rejecting signals having other frequencies, especially the 50 Hz or 60 Hz power signal.

Various modulation techniques can be used to encode data onto the high-frequency carrier signal. Some modulation techniques include, but are not limited to Amplitude Modulation (AM), Amplitude Shift Keying (ASK), Frequency Modulation (FM), Frequency Shift Keying (FSK), Spread Frequency Shift Keying (SFSK), Binary Phase Shift Keying (BPSK), Quadrature Amplitude Modulation (QAM), Phase Shift Keying (PSK) and Orthogonal Frequency Division Multiplexing (OFDM). The carrier frequency and modulation technique that is used depends on the type of communication needed. In general, higher-frequency carriers allow faster data rates at the expense of not traveling as far on a pair of conductors. While low-frequency carriers travel farther, but support slower data rates. Similarly, simple modulation techniques such as ASK and FSK are easier to implement since they do not require much computational effort, but do not perform as well in the presence of interference. More complex modulation schemes, such as OFDM, for example, use greater processing power, but perform admirably in the presence of interference.

Figure 5:
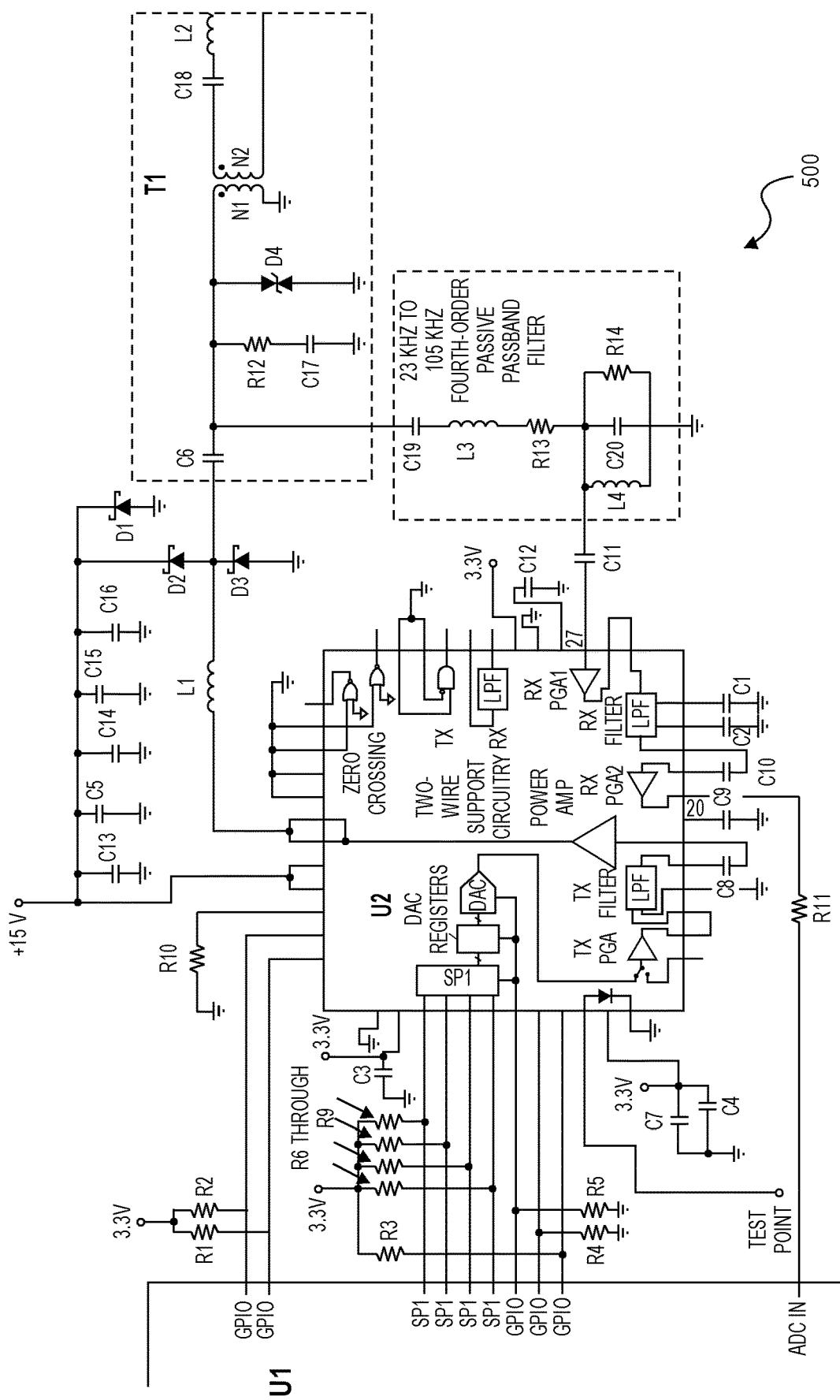
FIG. 5 is a schematic diagram of an exemplary power line communication circuit, according to certain embodiments.

FIG. 5 illustrates a schematic diagram for an embodiment of a power line communication circuit (PLCC) 500 configured to receive power line communication signals, demodulate the embedded data from the received signals, transmit power line communication signals, and modulate data onto the transmitted signals. In other embodiments, other approaches to power line communications and other integrated circuits from other manufacturers could be used.

In an embodiment, the PLCC 500 comprises a microcontroller U1, an analog front-end device (AFE) U2, diodes D1-D4, resistors R1-R14, capacitors C1-C20, and inductors L1-L3. In an embodiment the controller powerline communications module (CPCM) 404 comprises the power line communication circuit (PLCC) 500.

In some embodiments, the PLCC 500 electrically couples to the 120 VAC power line and further comprises a transformer T1. Beginning at the power line input, inductor L2 and coupling capacitor C18 provide a first stage of low frequency rejection, while blocking imbalances (direct current signals) on either side of the circuit. Next, the signal is coupled to the transformer T1. In an embodiment, transformer T1 has approximately a 1.5:1 turns ratio. Transformer T1 provides additional selectivity (filtering) and provides isolation from the power line for safety reasons. A suitable device for transformer T1 is PN 70P7282 available from Vitec Inc., or the like.

In an embodiment, the PLCC 500 electrically couples to an output of the 24 VAC transformer found in the controller 402. The 24 VAC transformer provides isolation from the power line for safety reasons and transformer T1 is not needed for isolation. In an embodiment, transformer T1 can be omitted when the 24 VAC transformer is providing the isolation from the power line.

The signal then enters the analog front-end device (AFE) U2. A suitable part for U2 is PN AFE031 available from Texas Instruments, or the like. Note that the signal enters AFE U2 on more than one pin. Pin 27 serves as the receive input and is where the carrier signal coming from the power line enters the receive chain. There is an additional band pass filter between transformer T1 and AFE U2 pin 27, comprising capacitor C19, inductor L3, resistor R13, resistor R14, capacitor C20, and inductor L4. The signal out of transformer T1 is also coupled to AFE U2 pins 42 and 43. This is the transmit path and two pins are used due to high current leaving AFE U2 in order to drive the carrier signal onto the power line.

The functions provided by AFE U2 and the associated surrounding circuitry can be summed up as follows. The receive chain provides additional low-pass filtering and amplification before outputting the signal on AFE U2 pin 20. The transmit chain generates the transmit signal via an integrated digital to analog converter (DAC) and provides filtering and power amplification of the signal. AFE U2 is then coupled to microcontroller U1, which provides modulation and demodulation.

In an embodiment, the microcontroller U1 comprises a TMS320F28X available from Texas Instruments, or the like. In other implementations, portions of the AFE U2 may be integrated into the same IC as the microcontroller U1. In yet other implementations, the AFE U2 may be replaced by discrete circuitry.

Figure 6:
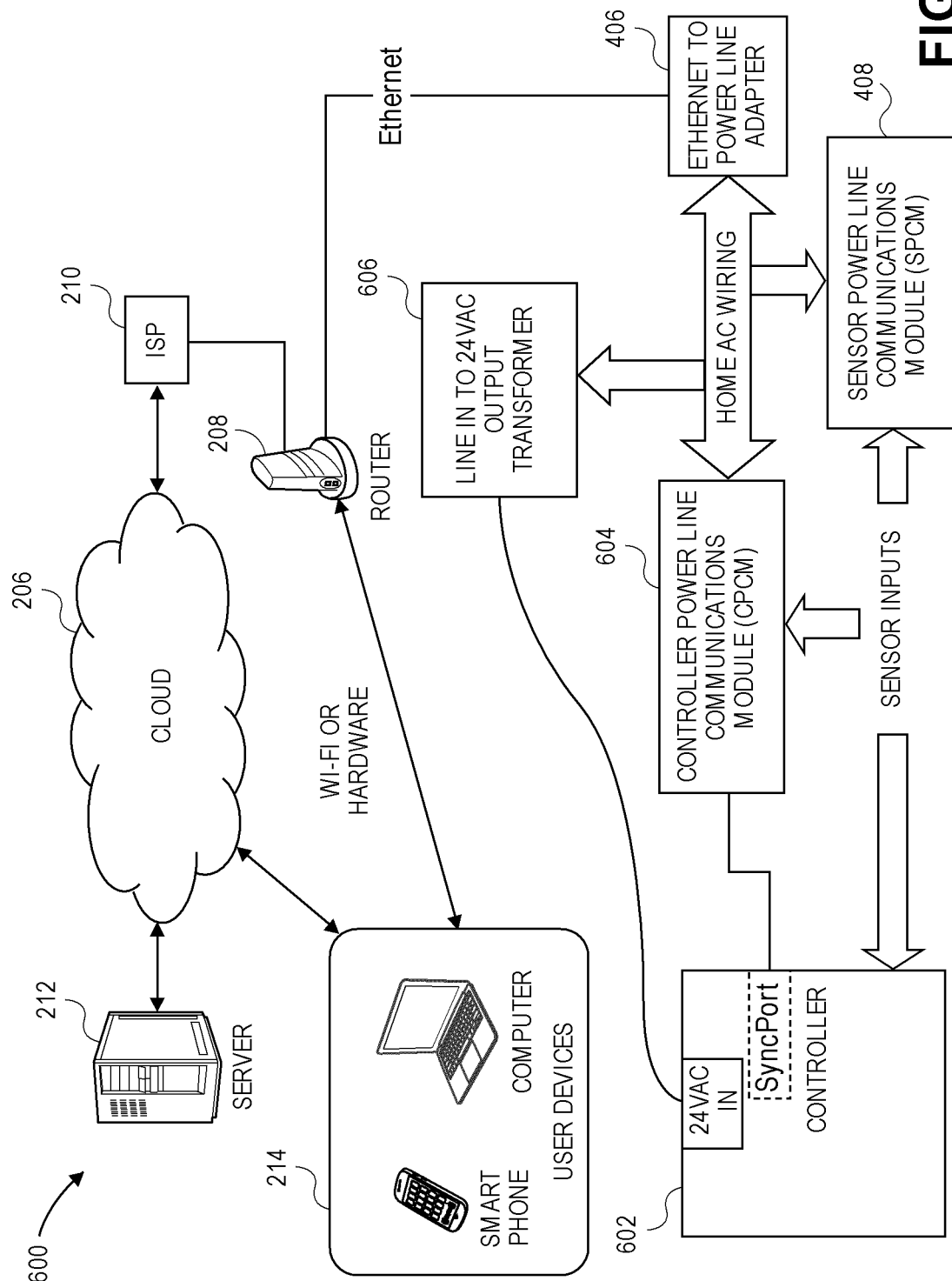
FIG. 6 illustrates another embodiment of a landscape system using power line communication to remotely control a landscape controller.

FIG. 6 illustrates another embodiment of a landscape system 600 using power line communications to remotely control a controller 602. The system 600 comprises the controller 602, the Controller Power Line Communication Module (CPCM) 604, and the Ethernet to power line adapter 406.

The controller 602 comprises the SyncPort™, a 24 VAC input and one or more sensor inputs. The controller 602 connects to the CPCM 604 via a hardwire connection to the SyncPort™ and the CPCM 604 electrically couples to the power line. The CPCM 604 uses power line communication techniques to use existing AC wiring to communicate with the Ethernet to power line adapter 406 as described above. The CPCM 604 communicates the decoded data from the power line to the controller 602 via the SyncPort™. In an embodiment, the CPCM 604 comprises the PLCC 500. In another embodiment, the controller 602 comprises the CPCM 604.

The system 600 further comprises one or more sensor power line communications modules (SPCM) 408 as described above with respect to FIG. 4. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of the sensor power line communications module (SPCM) 408, the controller power line communication module (CPCM) 604, and the controller 602.

The system 600 of FIG. 6 further comprises a transformer 606 such that the power line input to 24 VAC is handled in a separate transformer and connected separately to the controller 602. The transformer 606 comprises a power line input to 24 VAC output transformer configured to receive the power line input and provide approximately 24 VAC to the controller 602.

Figure 7A:
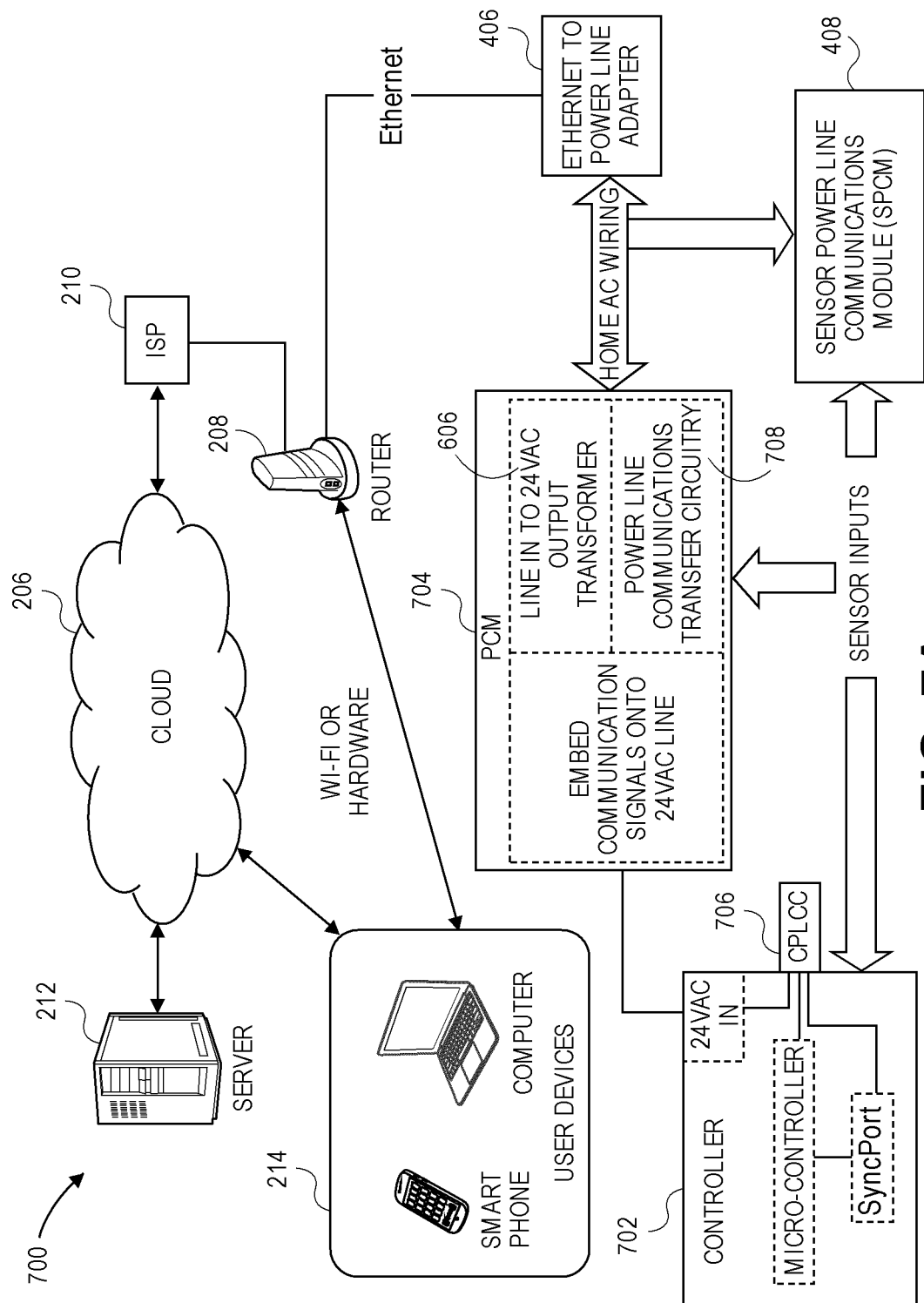
FIGS. 7A and 7B illustrate other embodiments of a landscape system using power line communications to remotely control a landscape controller.

FIG. 7A illustrates another embodiment of a landscape system 700 using power line communications to remotely control a controller 702. The system 700 comprises the controller 702, a Power and Communication Module (PCM) 704, and the Ethernet to power line adapter 406.

The controller 702 comprises a 24 VAC input, a processor or microcontroller, and the SyncPort™. The controller 702 is associated with Communications Power Line Communication Circuitry (CPLCC) 706, which may be a module attached to the outside of the controller 702, as illustrated in FIG. 7A. In another embodiment, the CPLCC 706 may be embedded into the controller 702 or a module attached inside the controller housing, as illustrated in a system 750 of FIG. 7B.

The Power and Communication Module (PCM) 704 comprises a transformer, such as the power line input to 24 VAC transformer 606, and circuitry to embed communication signals onto the 24 VAC signal. The PCM 704 uses power line communication techniques to use existing AC wiring to communicate with the Ethernet to power line adapter 406 as described above.

Figure 7B:
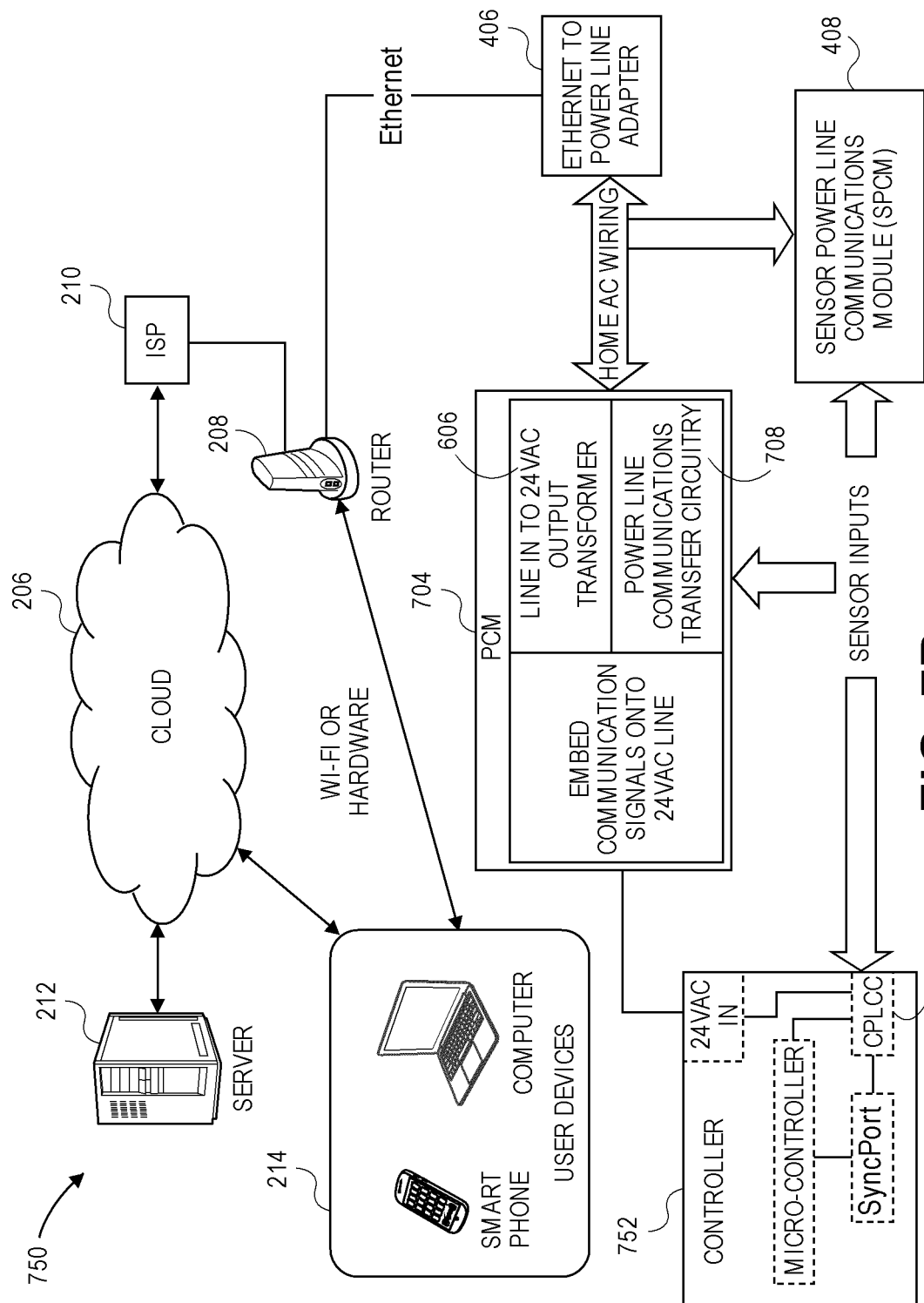

In the landscape systems 700, 750 illustrated in FIGS. 7A and 7B, respectively, communication signals are transferred from the incoming power line and embedded onto the 24 VAC signal. In an embodiment, the voltage of the incoming power line is reduced to approximately 24 VAC at the transformer 606. Communication signals on the incoming line voltage are embedded onto the 24 VAC signal after the transformer 606.

In an embodiment, the 24 VAC transformer 606 couples the carrier signal(s) and embedded data used by the power line communication system. If the transformer 606 comprises a high inductance, for example, it would represent a high impedance to the power line carrier, and it may be difficult for the transformer to drive the carrier onto the 24 VAC signal. In such a case, the power and communications module 704 further comprises power line communications transfer circuitry 708 to allow the carrier to by-pass the transformer 606.

In an embodiment, the power line communications transfer circuitry 708 comprises one or more capacitors linking the primary and secondary coils of the transformer 606. The CPLCC 706 extracts the carrier signal and decodes the embedded data from the 24 VAC signal or embeds the data on to carrier signal and inserts the carrier signal onto the 24 VAC signal while isolating the rest of the controller 702, 752 from the high frequency carrier.

If the controller load were, for example, capacitive, then it would likely attenuate the carrier signal to a level that would preclude communication. In an embodiment, an inductor between the output of the CPLCC 706 and the rest of the controller 702, 752 provides the isolation. The value of the inductor is selected so that it appears to be a virtual "open" circuit to the carrier frequency of the power line communication system.

In an embodiment, the 24 VAC signal, the CPLCC 706, the SyncPort™ and the microcontroller are electrically connected within the controller housing. In an embodiment, the CPLCC 706 communicates the decoded data from the 24 VAC signal to the controller 702, 752 via the SyncPort™. In other embodiments, the CPLCC 706 communicates the decoded data directly with the microcontroller without using the SyncPort™. In a further embodiment, the power and communications module 704 comprises an integral unit that plugs into a wall outlet. In a yet further embodiment, the power and communications module 704 comprises conduit with line voltage connected to the power and communications module 704 and attached to the controller 702, 752. In another embodiment, the power and communications module 704 comprises a stand-alone module located between the incoming power line voltage and the controller 702, 752.

The systems 700, 750 of FIGS. 7A and 7B, respectively, further include one or more sensor power line communications modules (SPCM) 408 as described above. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of the sensor power line communications module (SPCM) 408, the power and communication module 704, and the controller 702, 752.

Figure 8:
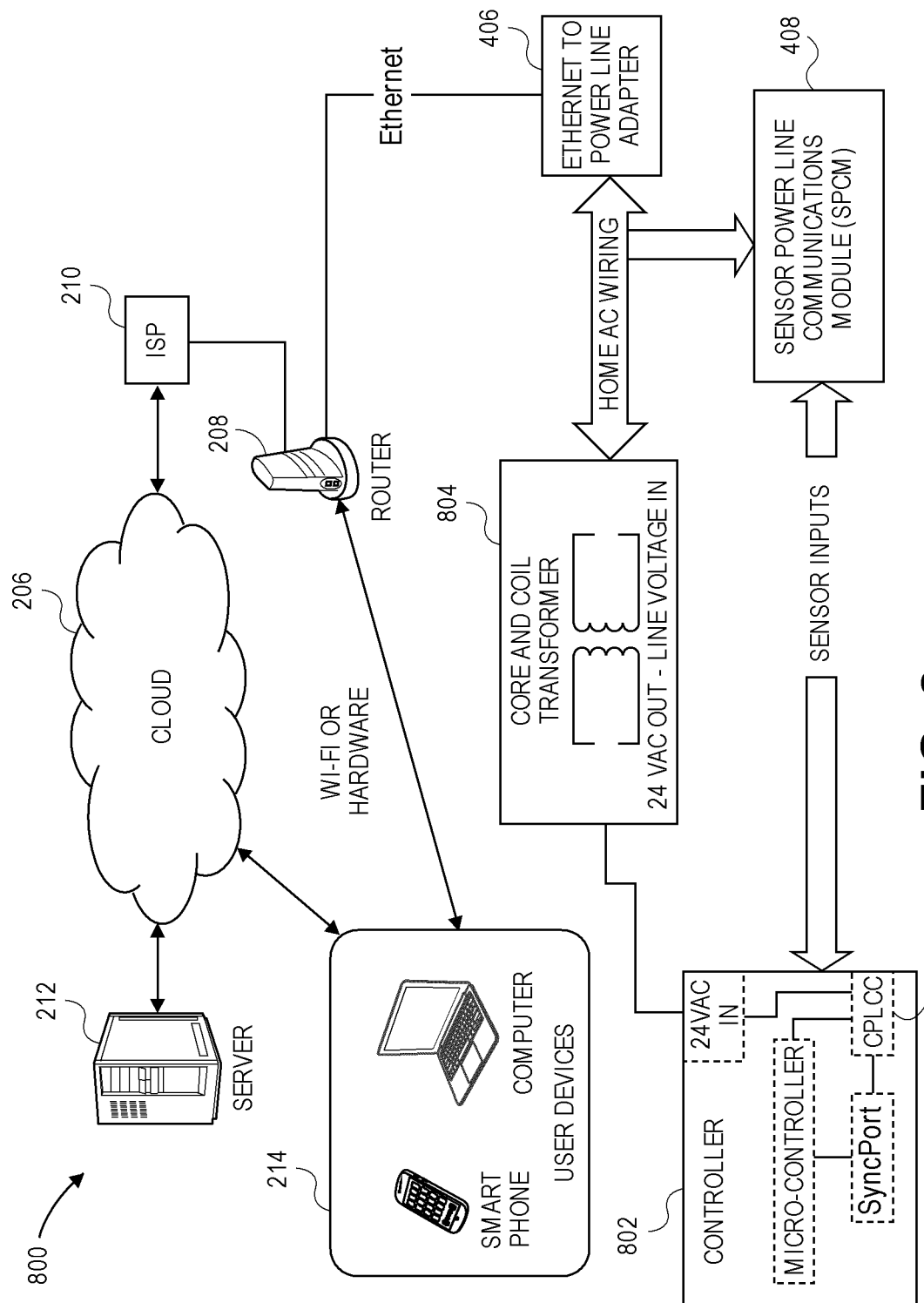
FIG. 8 illustrates another embodiment of a landscape system using power line communication to remotely control a landscape controller.

FIG. 8 illustrates another embodiment of a landscape system 800 using power line communication to remotely control a controller 802. The system 800 comprises the controller 802, a transformer 804, and the Ethernet to power line adapter 406. The controller 802 comprises a 24 VAC input, a processor or microcontroller, the SyncPort™, and the Communications Power Line Communication Circuitry (CPLCC) 706.

The transformer 804 comprises a core and coil transformer that receives line voltage and provides approximately 24 VAC. The controller 802 receives the 24 VAC signal from the transformer 804. Communications that are embedded in the incoming line voltage are transferred through the core and coil transformer. 24 VAC wiring connects to the controller 802 and the controller 802 receives the 24 VAC signal with the embedded communications.

In an embodiment, the CPLCC 706 is embedded into the controller 802. In another embodiment, the CPLCC 706 is attached to the controller 802 and connected to the SyncPort™ and to the 24 VAC input of the controller 802. In a further embodiment, the CPLCC 706 is mounted inside the controller 802. In another embodiment, the CPLCC 706 is mounted to the outside of the controller 802.

In an embodiment, the 24 VAC signal, the CPLCC 706, the SyncPort™ and the microcontroller are electrically connected within the controller housing. In an embodiment, the CPLCC 706 communicates the decoded data from the 24 VAC signal to the microcontroller via the SyncPort™. In other embodiments, the CPLCC 706 communicates directly with the microcontroller without using the SyncPort™. In an embodiment, the transformer 804 electrically connects to the 24 VAC input of the controller 802.

The system 800 further includes one or more sensor power line communications modules (SPCM) 408 as described above. The sensors comprise one or more of ET system, Solar Sync, rain, temperature, soil moisture, wind, humidity, or the like, in any combination. The sensors may be connected to one or more of the sensor power line communications module (SPCM) 408 and the controller 802.

Figure 9:
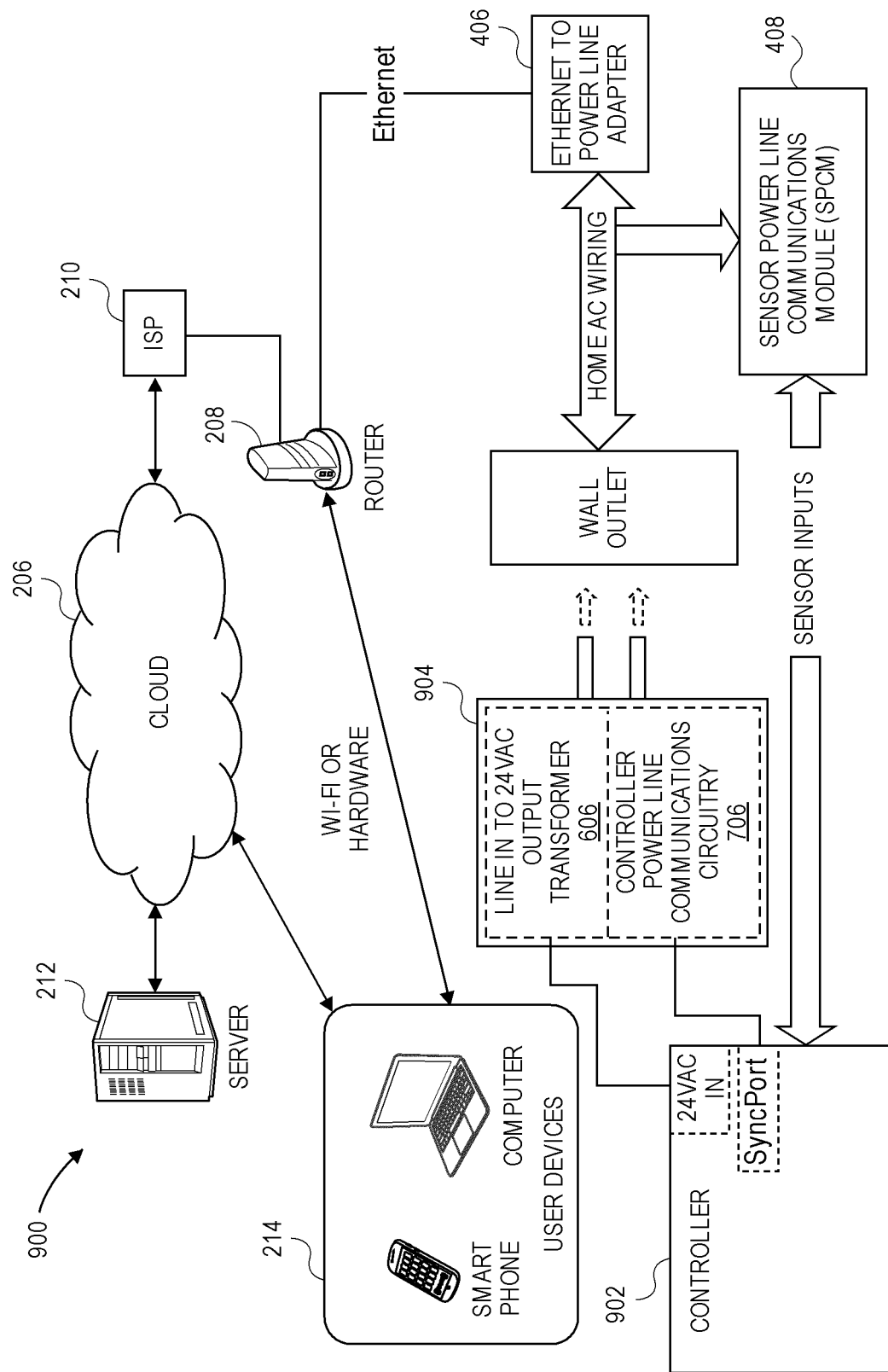
FIG. 9 illustrates another embodiment of a landscape system using power line communication to remotely control a landscape controller.

FIG. 9 illustrates another embodiment of a landscape system 900 using power line communication to remotely control a controller 902. The system 900 comprises the controller 902, a power puck 904, and the Ethernet to power line adapter 406. The controller 902 comprises a 24 VAC input and the SyncPort™. The power puck 904 comprises a line-in-to-24 VAC output transformer 606 and the Controller Power Line Communications Circuitry (CPLCC) 706 and is configured to plug into a line voltage wall outlet. In an embodiment, the power puck 904 electrically connects to the line voltage in proximity to the controller 902. The power line in to 24 VAC output transformer 606 electrically couples to the 24 VAC input and the CPLCC 706 electrically couples to the SyncPort™.

Incoming line voltage is received at the power puck 904, converted to 24 VAC by the line-in-to-24 VAC output transformer 606 and routed to the controller 902. In an embodiment, the line-in-to-24 VAC output transformer 606 comprises a core and coil transformer. The CPLCC 706 comprises an embodiment of the PLCC and is electrically coupled to the SyncPort™. In an embodiment, the power puck 904 further comprises an embedded cable, embedded cables, or one or more connectors with one or more separate cables that connect the power puck 904 to the controller 902. In another embodiment, the power puck 904 further comprises an embedded power cord for transmission of the 24 VAC and a plug to connect to a communications cable that attaches to the SyncPort™.

The system 900 further includes one or more sensor power line communications modules (SPCM) 408 as described above. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of the sensor power line communications module (SPCM) 408 and the controller 902.

Figure 10:
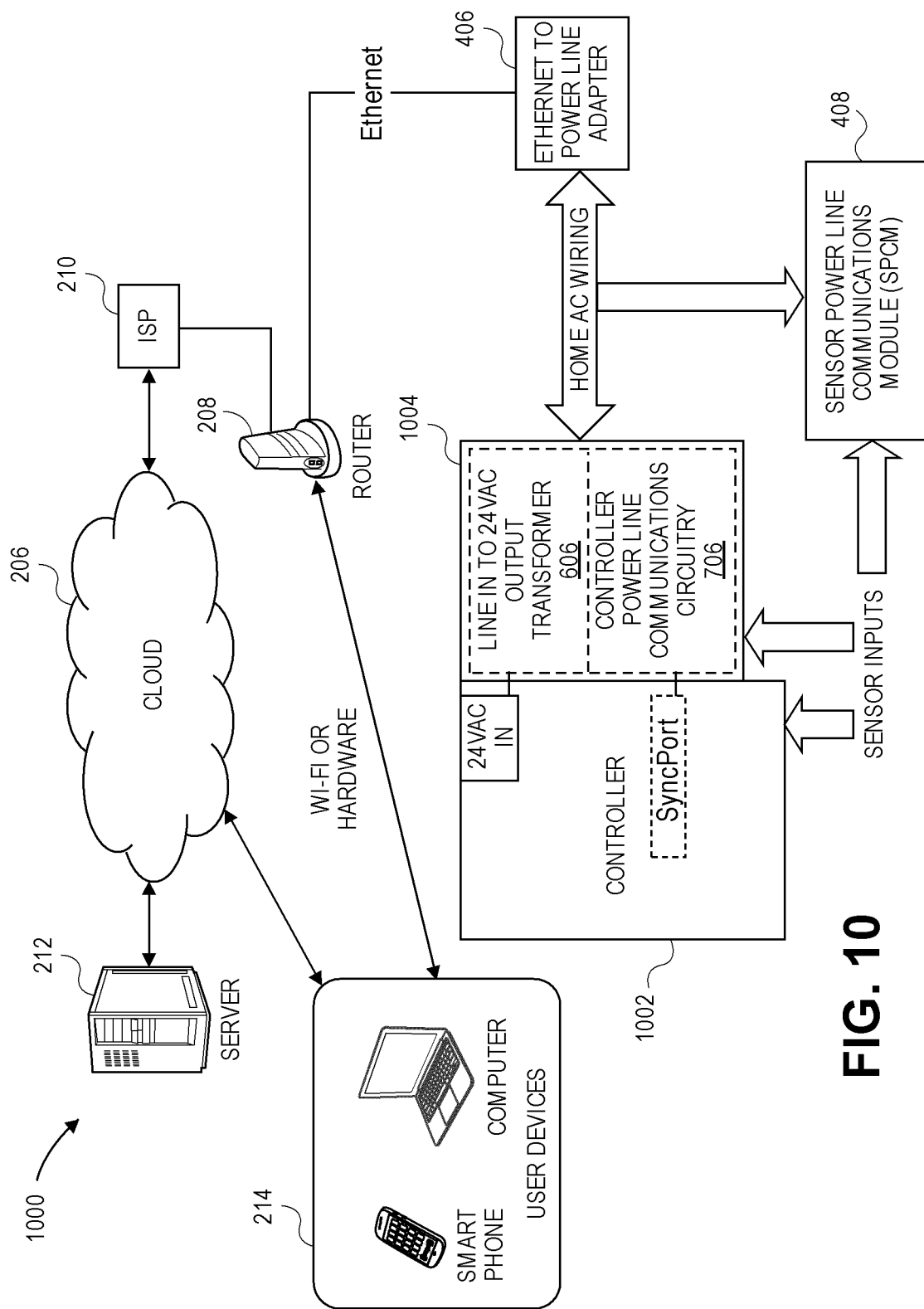
FIG. 10 illustrates another embodiment of a landscape system using power line communication to remotely control a landscape controller.

FIG. 10 illustrates another embodiment of a landscape system 1000 using power line communication to remotely control a controller 1002. The system 1000 comprises the controller 1002, a power box 1004, and the Ethernet to power line adapter 406. The controller 1002 comprises a 24 VAC input and the SyncPort™. The power box 1004 comprises the line-in-to-24 VAC output transformer 606 and the Controller Power Line Communications Circuitry (CPLCC) 706. In an embodiment, the line-in-to-24 VAC output transformer 606 comprises an incoming 120/208/230 VAC to 24 VAC core and coil transformer. The Controller Power Line Communications Circuitry (CPLCC) 706 comprises an embodiment of the PLCC 500 and is electrically coupled to the SyncPort™. The line-in-to-24 VAC output transformer 606 electrically couples to the 24 VAC input and the CPLCC 706 electrically couples to the SyncPort™. In an embodiment, the power box 1004 electrically connects to the line voltage and is configured for indoor or outdoor use.

In an embodiment, the power box 1004 comprises an embedded cable, embedded cables, or one or more connectors with one or more separate cables that connect the power box 1004 to the controller 1002. In another embodiment, the power box 1004 is configured to be approximately water tight to protect the wiring and circuitry when it is mounted to a controller that is installed outdoors.

The system 1000 further includes one or more sensor power line communications modules (SPCM) 408 as described above. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of the sensor power line communications module (SPCM) 408, the power box 1004, and the controller 1002.

Sensor Inputs

As described above, FIGS. 1, 3, 4, 6-10 illustrate sensor inputs. A variety of sensors can be connected to the systems 220, 300, 400, 600, 700, 750, 800, 900, 1000. The server 212 may provide sensor data to one or more of the irrigation controller, lighting controller, or landscape controller 202, 302, 402, 602, 702, 752, 802, 902, 1002, LAN module 200, CPCM 404, 604, 704, 904, 1004, SPCM 408, and Wi-Fi module 304. One or more of the irrigation controller, lighting controller, or landscape controller 202, 302, 402, 602, 702, 752, 802, 902, 1002, LAN module 200, CPCM 404, 604, 704, 904, 1004, SPCM 408, and Wi-Fi module 304 may comprise the sensor inputs and provide the sensor data. Thus, any combination of the server 212, controller 202, 302, 402, 602, 702, 752, 802, 902, 1002, LAN module 200, CPCM 404, 604, 704, 904, 1004, SPCM 408, and Wi-Fi module 304 can poll one another to acquire the sensor data as required to perform a given task.

User Displays

The user devices illustrated in the systems described herein comprise a display screen. The user devices permit the user to enter commands to the systems and receive data from the systems.

Additional Embodiments

Figure 11:
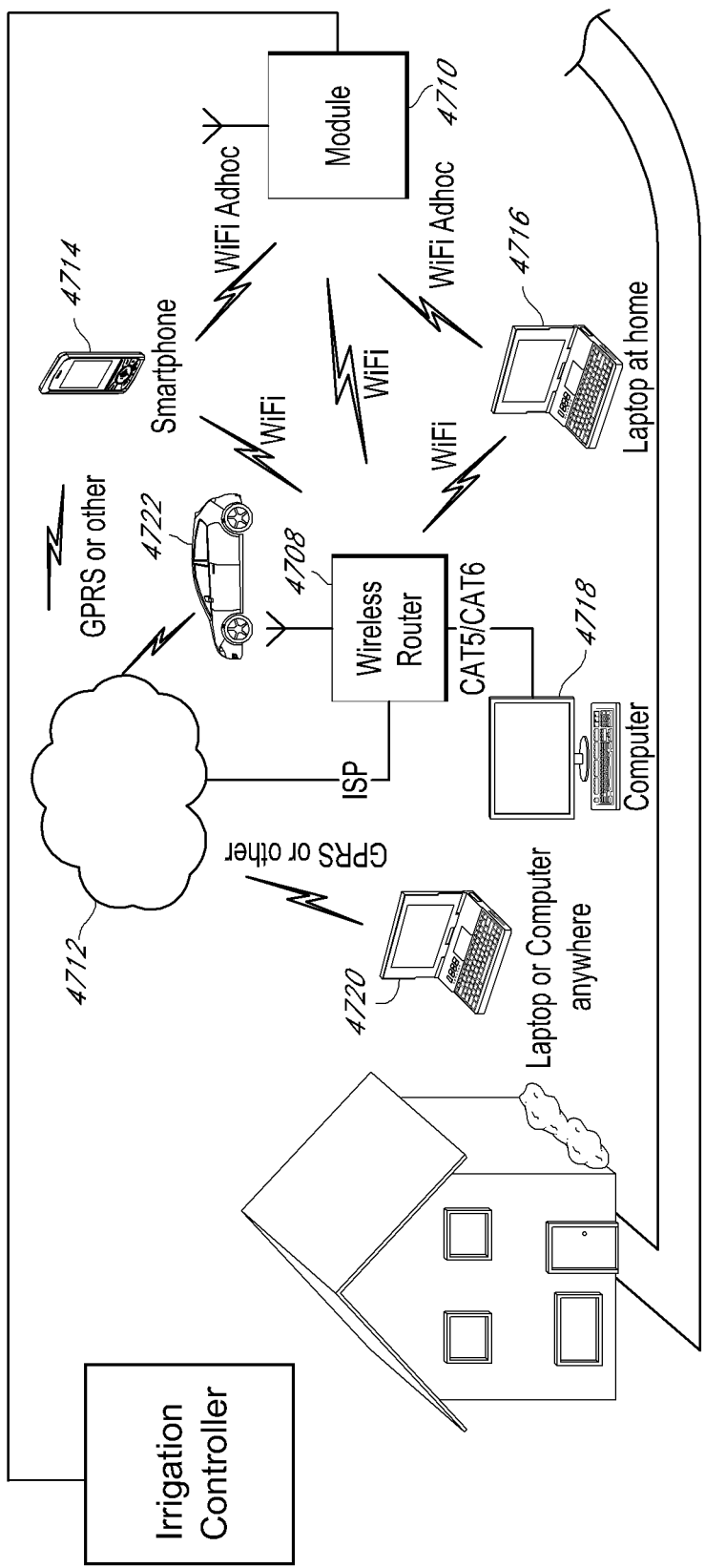
FIG. 11 illustrates an exemplary system comprising a controller configured to be controlled remotely, according to certain embodiments.

FIG. 11 illustrates an exemplary system 4700 comprising a controller 4702 that is configured to be controlled remotely. In an embodiment, the controller 4702 comprises an irrigation controller and is configured to control a plurality of irrigation valves. In another embodiment, the controller 4702 comprises a lighting controller and is configured to control a plurality of lighting fixtures. In a further embodiment, the controller 4702 comprises a landscape controller and is configured to control sprinkler valves and lighting fixtures.

The system 4700 further comprises a wireless module 4710, which electrically couples, via wire or other mediums, to the controller 4702. The wireless module 4710 communicates wirelessly to devices, such as a smartphone 4714, a laptop computer 4716, and other devices that have WiFi™ connection capability using a peer-to-peer communication mode such as ad hoc. In this communication mode, custom software, firmware, applications, programs, or the like, are written for both the wireless module 4710 and the communicating device 4714, 4716. In an embodiment, this proprietary communication approach is not constrained by conventional standards, such as the 802.11 standard and its versions, for example.

The user can send commands from the smart phone 4714, the laptop computer 4716, or other communicating devices within the range of the wireless module 4710 to remotely control the system 4700. For example, the user can send commands to turn ON/OFF, adjust the irrigation schedule, adjust the run time, adjust the irrigation days of the week, adjust the lighting schedule, control the brightness, control the color and hue, and the like for the system 4700, a zone, or a specific module from the remote device 4714, 4716. In an embodiment, the user views the web page being served by the wireless module 4710 by, for example, opening up the Internet Explorer® or other web browser on the smartphone 4714 or the laptop 4716. The user then interacts with the web page to control the system 4700. In another embodiment, the web page is served from the computer in the controller 4702, and the wireless module 4710 provides the RF connectivity.

The wireless module 4710 wirelessly receives the commands using the ad hoc or other peer to peer protocol, electrically converts the signal and sends the commands, via wire, to the controller 4702. In an embodiment, the module 4710 converts the signal to baseband. The controller 4702 receives the commands and sends the message to the addressed modules or the modules in the specified zones via the two-wire path.

In another embodiment, the system further comprises a wireless router 4708 and the wireless module 4710 is a WiFi™ enabled device. WiFi™ enabled wireless devices, such as laptops or computers 4716, 4720, smartphones 4714, WiFi™ enabled automobiles 4722, or the like, communicate with the router 4708 using a standard communication protocol, such as 802.11. In other embodiments, a device, such as a computer 4718 is electrically connected, via wire or a cable, to the router 4708. The user uses the devices 4714, 4716, 4718, 4720, 4722 to send commands to the system 4700. The devices 4714, 4716, 4718, 4720, 4722 send the commands through the router 4708 using a standard router protocol. The router 4708 connects to the World Wide Web 4712 using an Internet Service Provider (ISP) and an Internet connection. In another embodiment, the smartphone 4714 communicates through the Internet using a general packet radio service (GPRS) protocol.

In one embodiment, the wireless module 4710 comprises the router 4708. In another embodiment, the controller 4702 comprises the router 4708.

The devices 4714, 4716, 4718, 4720, 4722 access the WiFi™ enabled wireless module 4710 through its Internet Protocol (IP) address. The module 4710 sends the commands to the controller 4702, where the controller 4702 sends the command to the modules through the two-wire path. In this manner, a user can access the system 4700 from anywhere there is an Internet connection.

In a further embodiment, the module 4710 comprises an Ethernet module for communication using an Ethernet protocol via an Ethernet cable between the controller 4702 and the router 4708 and/or between two controllers 4702.

Figure 12:
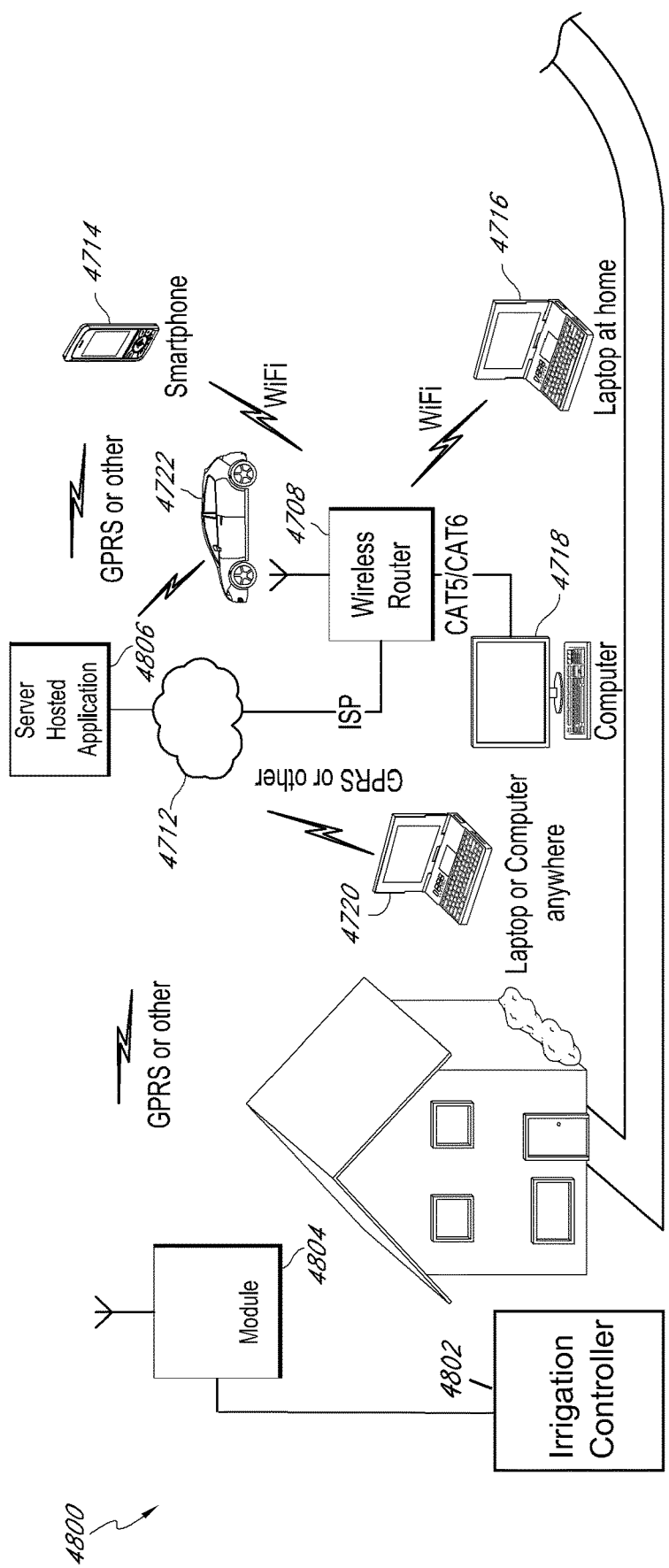
FIG. 12 illustrates another exemplary system comprising a controller configured to be controlled remotely, according to certain embodiments.

FIG. 12 illustrates another exemplary system 4800 comprising the controller 4802 that is configured to be controlled remotely. The controller 4802 sends the data encoded power waveform to the plurality of modules over the two-wire path. In an embodiment, the controller 4802 comprises an irrigation controller and is configured to control a plurality of decoders connected to irrigation valves. In another embodiment, the controller 4802 comprises a lighting controller and is configured to control a plurality of lighting fixtures. In a further embodiment, the controller 4802 comprises a landscape controller and is configured to control sprinkler valves and lighting fixtures.

The system 4800 further comprises a mobile carrier network module 4804, which electrically couples, via wire or other mediums, to the controller 4802. The module 4804 communicates to the World Wide Web (WWW) 4712 via a mobile carrier's network. Depending on the location and carrier, various standards, such as GPRS, GSM, and CDMA, and the like may apply. A suitable GPRS and GSM module, for example, is model number MTSMC-G-F4 available from Multitech Systems Inc. and the like. A suitable CDMA module, for example, is model MTSMC-C1-IP-N3 available from Multitech Systems Inc.

The controller 4802 can be accessed by devices, such as laptops or computers 4720, smartphones 4714, web-enabled automobiles 4722, or the like, in communication with the World Wide Web 4712 from any location. Further, the controller 4802 can be accessed by a wireless router 4708 in communication with the World Wide Web 4712 via an Internet service provider (ISP). Local devices, such as laptops or computers 4716, typically in proximity to the wireless router 4708 and typically communicating with the router 4708 using a standard communication protocol, such as 802.11, can also access the controller 4802. In other embodiments, a device, such as the computer 4718 is electrically connected, via wire or a cable, to the router 4708. In one embodiment, the controller 4802 comprises the router 4708.

The user uses the devices 4714, 4716, 4718, 4720, 4722 to send commands to the system 4800. In a first embodiment, firmware either inside the controller 4802 or in the module 4804 serves up a webpage. As long as the module 4804 can be found on the World Wide Web 4712, that webpage could be accessed by devices with a web browser, thus allowing control of the controller 4802. This is similar to the control provided by the WI-FI module 4710 discussed herein with respect to FIG. 11.

In another embodiment, an application is provided for application-enabled devices, such as the control devices 4714, 4716, 4718, 4720, 4722. The user interacts with the application, and the application communications with the module 4804 via the World Wide Web 4712. In an embodiment, the application is written for various platforms, such as iPhone, Android, or the like.

In another embodiment, a web-based application 4806 is hosted on a server on the World Wide Web 4712. In an embodiment, this application 4806 is larger/more complex than could be stored in the controller 4802 or the module 4804. The user interacts with this webpage 4806 using devices comprising a web browser and the application 4806 communicates with the controller 4802.

There are some practical considerations when using mobile carrier networks. Most mobile carriers actually have far fewer IP addresses than they do subscribers. This is because at any given point in time, only a fraction of the subscribers is interacting with the web. Therefore, after some time of inactivity, a mobile device will typically lose its IP address. If the mobile device goes online again, the network will issue a new (different) IP address. Furthermore, many times the IP addresses used by mobile carriers are private, not public, meaning they cannot be reached using the World Wide Web 4712. The significance of this is that if a user wants to connect with a device on a carrier's network, they must know the IP address of that device.

Understanding that people desire to use their networks to communicate with and to control devices, most carriers have workarounds for this problem. For instance, they often allow companies to set up special servers that have access to the private IP address of the devices they sell. This sort of "proxy" server would itself have a fixed IP address and would be easily accessible from anyone on the World Wide Web 4712. The server would use an authentication technique or password to allow a user in communication with it, to access those remote (private IP) nodes associated with the users account. In a sense, the server is a "conduit" to reach the private IP device.

This approach may be combined with any of the embodiments described above. For some embodiments, the server may be the same device that hosts the application 4806.

Authentication

Devices without Internet connectively are controlled locally by the user that has physical possession of the device. The user typically programs and control the device by selecting various user input, such as for example, pressing the buttons, turning the dials, switching switches, and the like.

Devices, such as the controllers illustrated in FIGS. 1-12, can be provided with Internet connectivity as described above. FIG. 12 illustrates the system 4800 to remotely control the controller 4802, according to an embodiment. The system 4800 comprises the controller 4802, such as the Pro-C® irrigation controller manufactured by Hunter Industries, Inc. In an embodiment, the controller 4802 comprises at least one of the LAN module, the WiFi module, and the powerline device described above to permit the controller Internet access.

Figure 13:
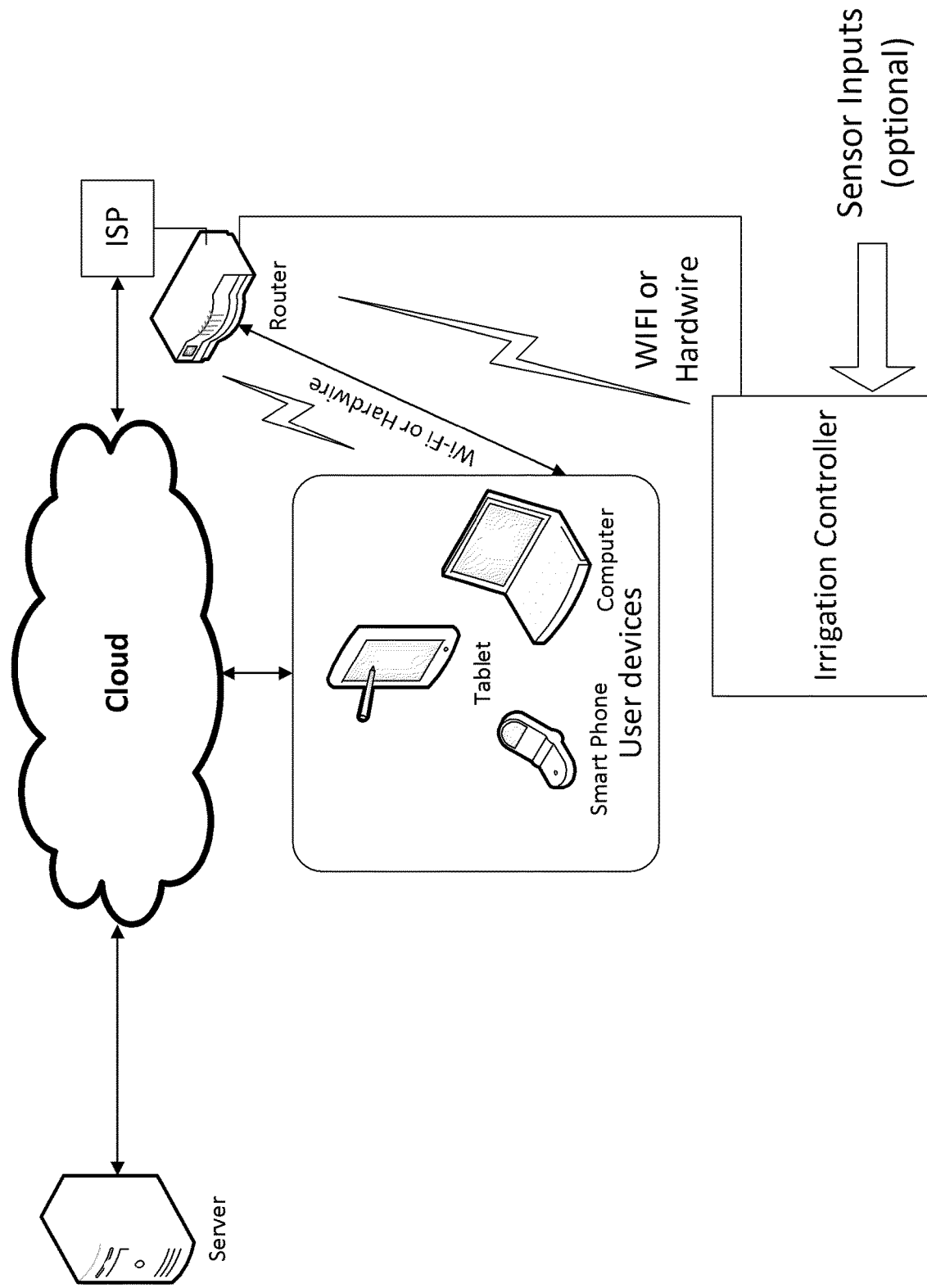
FIG. 13 illustrates a system to authenticate and authorize a user, according to certain embodiments.

In FIG. 13, the Internet or cloud is accessed via the router that is connected to an Internet Service Provider (ISP). The cloud-based server hosts an application that provides an end user with control and monitoring capability of a controller 1302 from the web-enabled user device via its web browser, custom software, or a dedicated application. In an embodiment, the web-enabled user devices comprise smart devices, such as, but not limited to smartphones, computers, laptops, tablets, and the like.

The controller 1302 optionally comprises sensor input capability, and thereby shares the sensor status with the server. This information may include, but is not limited to, flow rate, rain event, temperature, solar radiation, wind speed, relative humidity, motion, voltage, current, and soil moisture.

In an embodiment, the controller 1302 comprises an irrigation controller configured to control irrigation valves. In another embodiment, the controller 1302 comprises a lighting controller configured to control lighting fixtures. In a further embodiment, the controller 1302 comprises a landscape controller configured to control sprinkler valves and lighting fixtures. In a yet further embodiment, the controller 1302 comprises any device capable of providing feedback signals to the server.

In an embodiment, Internet of Things (IoT) connected devices typically comprise a display where a server through the cloud or the Internet sends proprietary login information that is displayed on the display. The user enters the proprietary login information into an application running on a smart device, such as a smart phone, a laptop, a tablet, and the like that is logged onto the server. The server receives the entered proprietary information from the smart device and compares it to the proprietary information sent to the IoT device in order to authenticate and authorize the user to prevent someone other than the user to control the device. Once the user is authenticated and authorized, the user can control the IoT device remotely.

Legacy controllers can be configured with Internet connectivity, as described with respect to FIG. 13. However, in some embodiments, the legacy controllers do not comprise a display that is responsive to the web server or a display that is capable of receiving the proprietary login information used for authentication and authorization.

In an embodiment, a novel process is used to authenticate and authorize users to control an Internet connected device that does not comprise a display that is responsive to the web server. In an embodiment, the process uses signals provided in the device. The server displays the authentication instructions to the user on the user's smart device. The user follows the instructions to select user input on the device and the device communicates the selections to the server through the Internet. The server, in turn, determines whether the instructions have been followed. If the instructions have been followed, the server authenticates the user and the user can control the device remotely via the smart devices In an embodiment, the process can be used to authenticate controllers, dishwashers, stoves, washing machines, dryers, assembly machines, molding machines and other home and industrial devices that have Internet connectivity and do not comprise a display that is capable of receiving authentication information from the server. The user is authorized by the cloud-based server after the user completes a series of instructions to set switches or dials on the device or any other user selectable input on the device. In an embodiment, the device comprises any of controllers 202, 302, 402, 602, 702, 752, 802, 902, 1002, 4702, 4802, 1302.

FIGS. 14A-22 illustrate an exemplary process 1400 to authenticate and authorize a user on an Internet connected device using the user's web-enabled device, such as a smart device. In an embodiment, the Internet connected device is without a display. In another embodiment, the Internet connected device is without a display that is responsive to the web server. In another embodiment, the Internet connected device comprises a display. In an embodiment, the Internet connected device comprises any of controllers 202, 302, 402, 602, 702, 752, 802, 902, 1002, 4702, 4802, 1302 described herein.

Account Set-Up

Figure 14A:
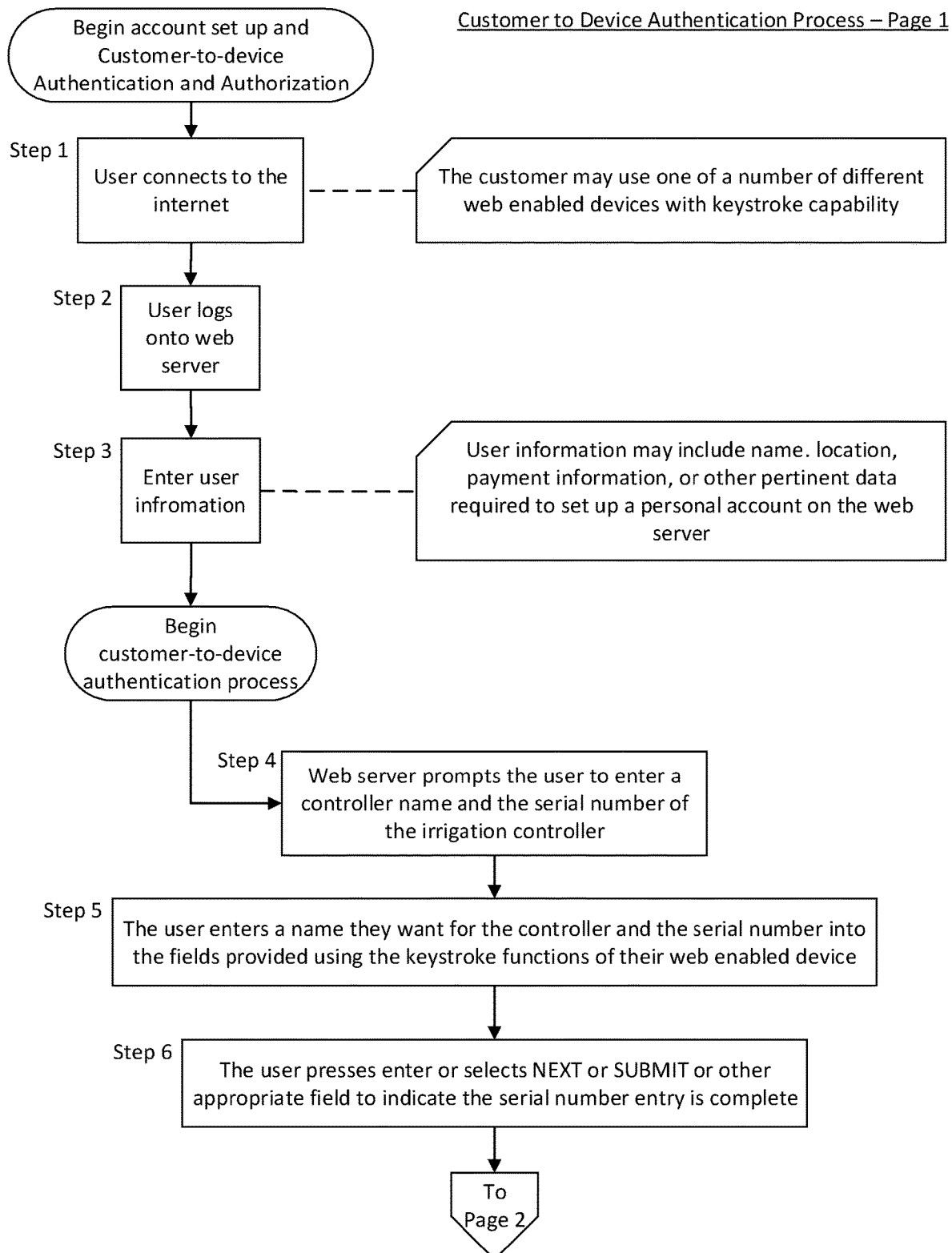
FIGS. 14A-14E are flow charts illustrating a process to authenticate and authorize a user, according to certain embodiments.
Figure 14B:
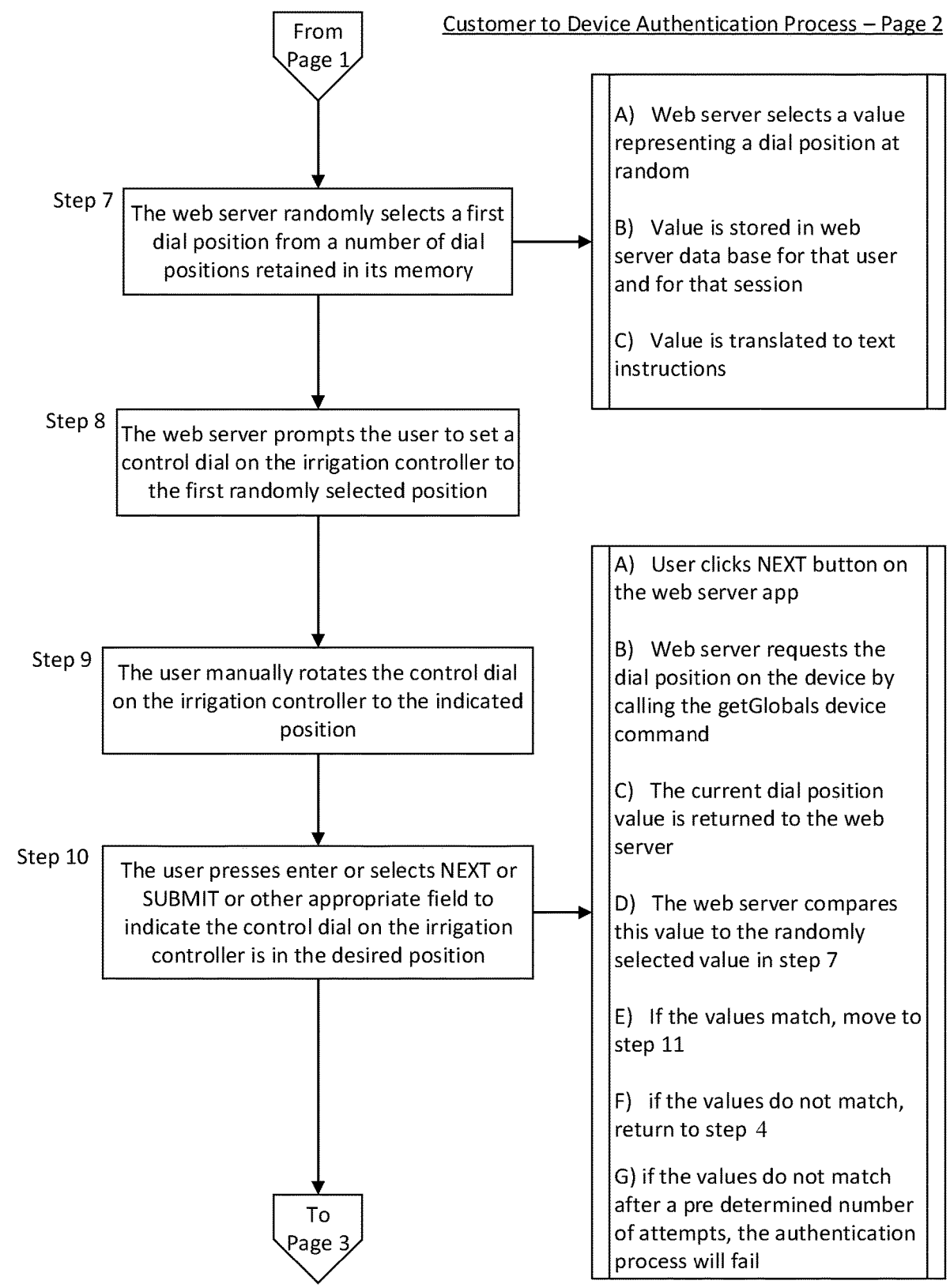
Figure 14C:
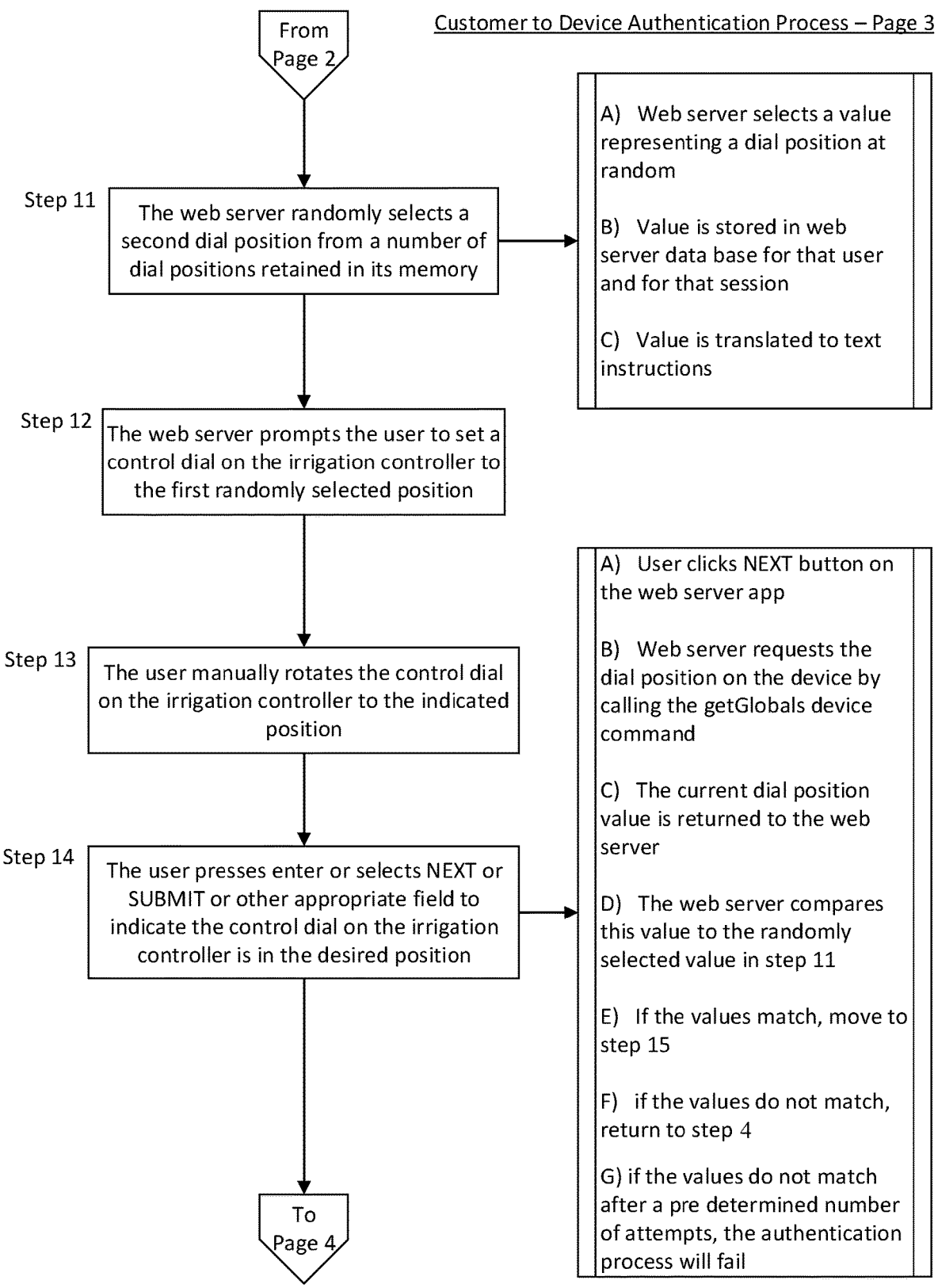
Figure 14D:
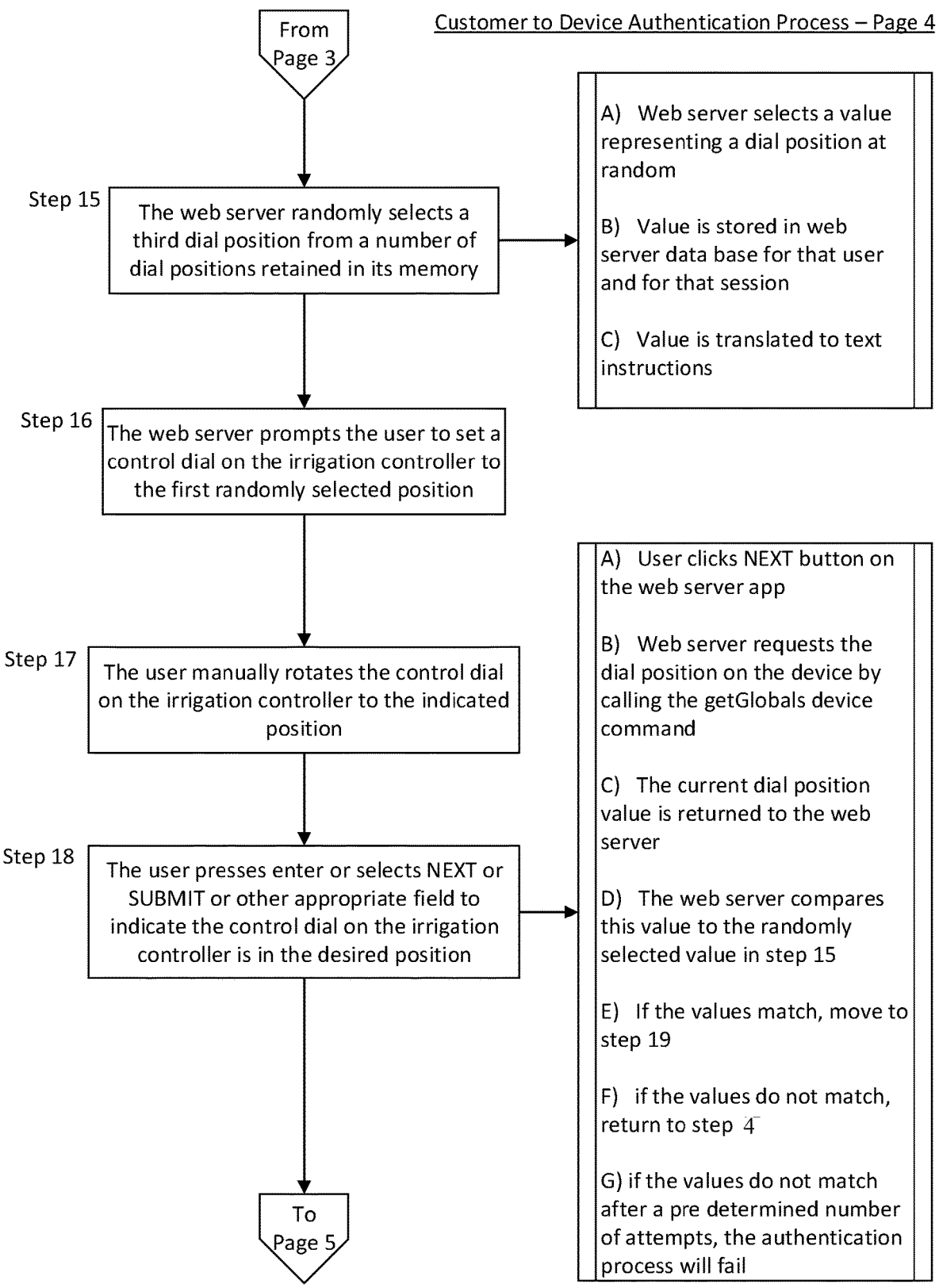
Figure 14E:
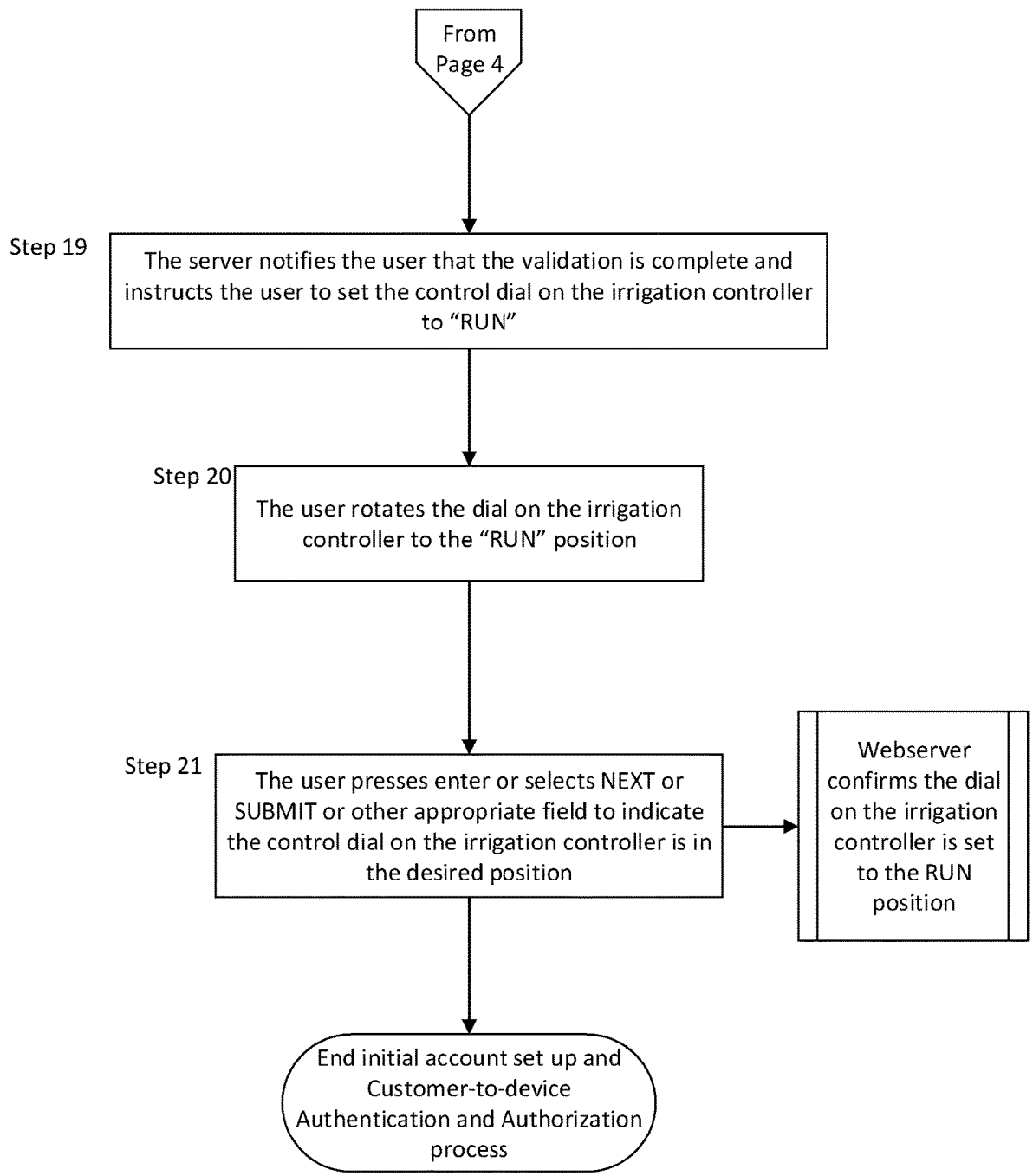

Beginning at FIG. 14A, the process 1400 sets up an account for the user. At step 1, the user connects to the Internet. In an embodiment, the user uses a web-enabled device, such as a smart device, that has keystroke capability. At step 2, the user logs onto the web server, and at step 3, the user enters user information. In an embodiment, the user information comprises one or more of name, location, payment information, or other information used to set up a personal account on the web server.

Customer-to-Device Authentication Process

At step 4, the web server prompts the user to enter a controller name and a serial number associated with the controller. At step 5, the user enters a name for the controller and the serial number of the controller into the fields provided using the key stroke functions of the web-enabled device. At step 6, the user submits the information. In some embodiments, the user may be asked to enter the location of the controller comprising, but not limited to, one or more of country, street address, city, state, and or postal code.

At step 7, the web server randomly selects a first dial position from a number of dial positions retained in its memory. In another embodiment, the web server randomly selects a position or action for any user input from the user inputs available on the controller, such as, but not limited to push buttons, slide switches, switches, and the like, stored in its memory.

Figure 15:
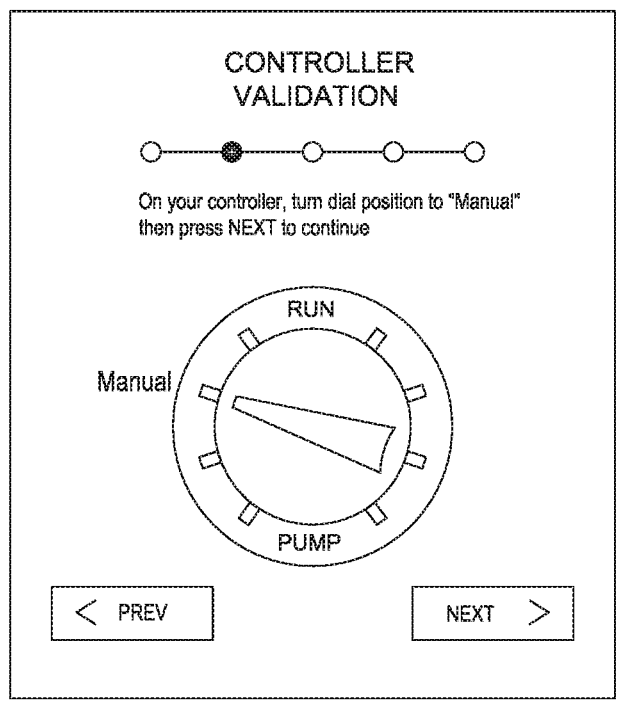
FIG. 15 illustrates an exemplary first display of a first randomly selected controller input to authenticate and authorize the user using the process of FIGS. 14A-14E, according to certain embodiments.

At step 8, the web server prompts the user to position the dial on the controller to the first randomly selected position. In an embodiment, the web server displays on the web-enabled device the first randomly selected position. FIG. 15 illustrates an exemplary display displayed on the user's web-enabled device to show the user the first randomly selected position. In this example, the server has instructed the user to move the dial to the MANUAL position. In another embodiment, the web server prompts the user to perform the action for the selected user input.

Figure 16:
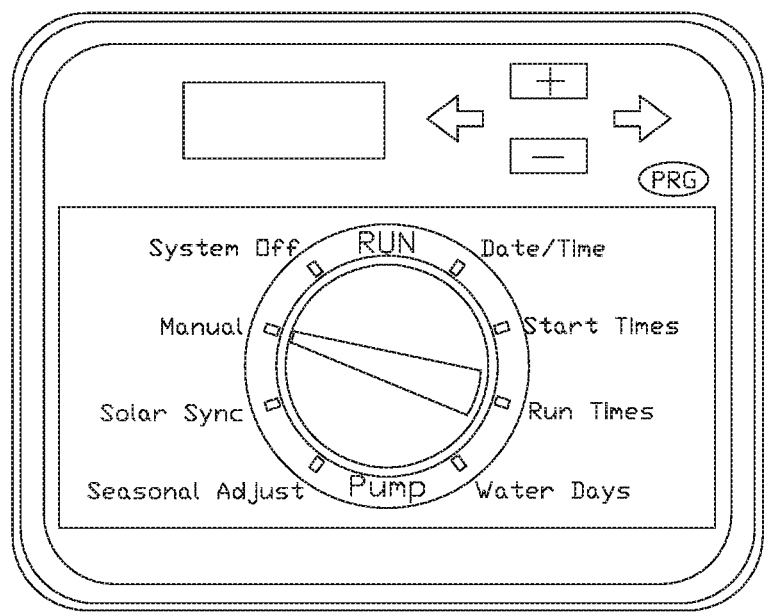
FIG. 16 illustrates an exemplary controller corresponding to FIG. 15, according to certain embodiments.

At step 9, the user manually rotates the control dial on the controller to the indicated position. FIG. 16 illustrates the dial on the controller that has been rotated to the first randomly selected position.

At step 10, the user confirms the manual positioning of the dial. The user may confirm the manual position is accurate by pressing ENTER or RETURN, or they may provide a button click such as selecting NEXT, SUBMIT, or another designated field. The user input may be confirmed by a mouse click, by using a stylus or finger on a touch screen, or voice commands. Any device feedback method currently known or developed in the future may be used to indicate that the control dial on the controller is in the first desired position.

In an embodiment, the user presses ENTER or selects NEXT or SUBMIT to indicate that the control dial on the controller is in the first desired position. In one embodiment, the user selects NEXT displayed on their web enabled device. This action triggers the web server to poll the controller to request the dial position.

In another embodiment, no user input is needed to indicate that the control dial on the controller is in the first desired position. Instead, the web server waits an amount of time after prompting the user to place the user input in the randomly selected position. In an embodiment, the web server waits a predetermined amount of time. In another embodiment, the web server starts a timer. In an embodiment, the amount of time is approximately 10 seconds. In other embodiments, the amount of time is less than approximately 10 seconds. In another embodiment, the amount of time is greater than approximately 10 seconds. In a further embodiment, the amount of time is approximately 5 seconds, 10 seconds, 20 seconds, 30, seconds, 40 seconds, 50 seconds, or one minute.

In another embodiment, the web server scans for input from the controller indicating the position of the user input one or more times during a predetermined time frame. In another embodiment, the web server waits for a predetermined time duration before requesting the position of the user input from the controller.

The controller returns with a value indicating the position of the control dial. If the control dial is in the desired position, the web server continues to step 11. If the control dial is not in the desired position, the web server requests the user to reset the control dial position. In some cases, the web server may randomly select another position for the user to try. If the user controller dial position is not in the requested position after a pre-determined number of attempts, the authentication fails and the user is notified.

At step 11, the web server randomly selects a second dial position from a number of dial positions retained in its memory. In another embodiment, the web server randomly selects a second position or action for any user input from the user inputs available on the controller, such as, but not limited to push buttons, slide switches, switches, and the like, stored in its memory.

Figure 17:
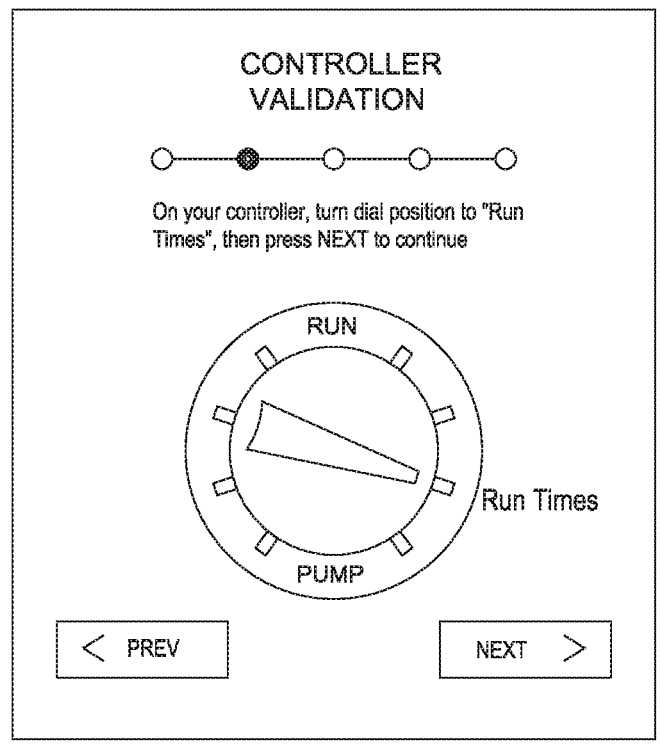
FIG. 17 illustrates an exemplary second display of a second randomly selected controller input to authenticate and authorize the user using the process of FIGS. 14A-14E, according to certain embodiments.

At step 12, the web server prompts the user to control the dial on the controller to the second randomly selected position. In an embodiment, the web server displays on the web-enabled device the second randomly selected position. FIG. 17 illustrates an exemplary display displayed on the user's web-enabled device to show the user the second randomly selected position. In this example, the server has instructed the user to move the dial to the RUN TIME position. In another embodiment, the web server prompts the user to perform the second action for the selected user input.

Figure 18:
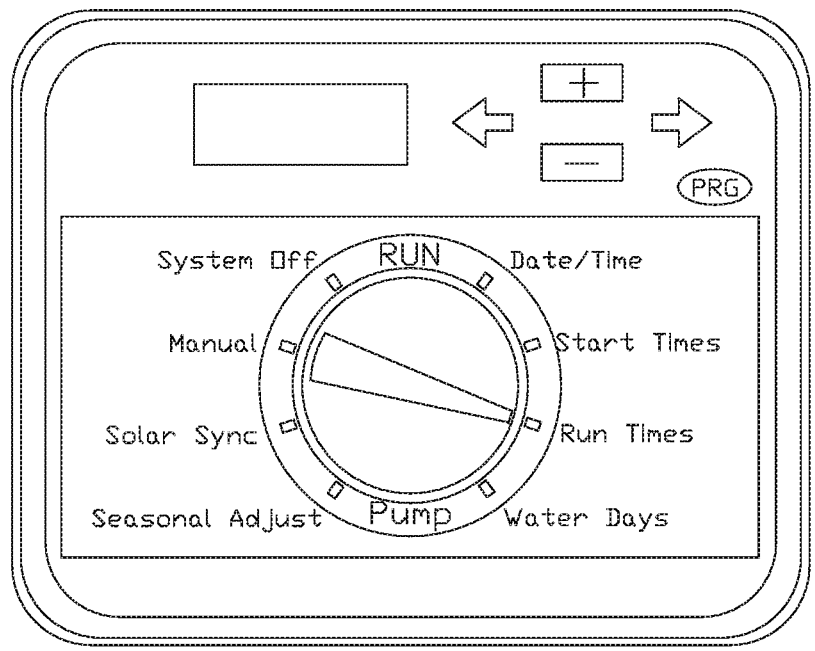
FIG. 18 illustrates an exemplary controller corresponding to FIG. 17, according to certain embodiments.

At step 13, the user manually rotates the control dial on the controller to the indicated position. FIG. 18 illustrates the dial on the controller that has been rotated to the second randomly selected position.

At step 14, the user confirms the manual positioning of the dial. The user may confirm the manual position is accurate by pressing ENTER or RETURN, or they may provide a button click such as selecting NEXT, SUBMIT, or another designated field. The user input may be confirmed by a mouse click, by using a stylist or finger on a touch screen, or voice commands. Any device feedback method currently known or developed in the future may be used to indicate that the control dial on the controller is in the second desired position.

In an embodiment, the user presses ENTER or selects NEXT or SUBMIT to indicate that the control dial on the controller is in the second desired position. In one embodiment, the user selects NEXT displayed on their web enabled device. This action triggers the web server to poll the controller to request the dial position.

In another embodiment, no user input is needed to indicate that the control dial on the controller is in the second desired position. Instead, the web server waits an amount of time after prompting the user to place the user input in the randomly selected position. In an embodiment, the web server waits a predetermined amount of time. In another embodiment, the web server starts a timer. In an embodiment, the amount of time is approximately 10 seconds. In other embodiments, the amount of time is less than approximately 10 seconds. In another embodiment, the amount of time is greater than approximately 10 seconds. In a further embodiment, the amount of time is approximately 5 seconds, 10 seconds, 20 seconds, 30, seconds, 40 seconds, 50 seconds, or one minute.

In another embodiment, the web server scans for input from the controller indicating the position of the user input one or more times during a predetermined time frame. In another embodiment, the web server waits for a predetermined time duration before requesting the position of the user input from the controller.

The controller returns with a value indicating the position of the control dial. If the control dial is in the desired position, the web server continues to step 15. If the control dial is not in the desired position, the server requests the user to reset the control dial position. In some cases, the web server may randomly select another position for the user to try. If the user controller dial position is not in the requested position after a pre-determined number of attempts, the authentication fails and the user is notified.

At step 15, the web server randomly selects a third dial position from a number of dial positions retained in its memory. In another embodiment, the web server randomly selects a third position or action for any user input from the user inputs available on the controller, such as, but not limited to push buttons, slide switches, switches, and the like, stored in its memory.

Figure 19:
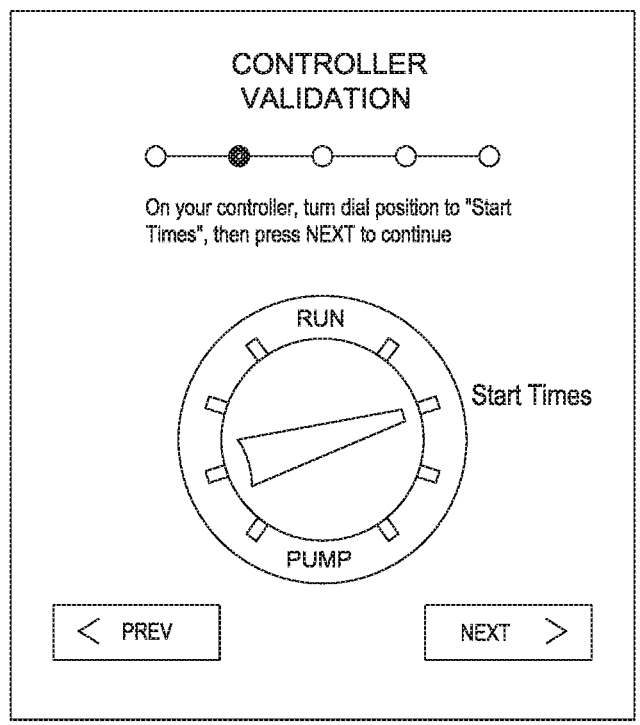
FIG. 19 illustrates an exemplary third display of a third randomly selected controller input to authenticate and authorize the user using the process of FIGS. 14A-14E, according to certain embodiments.

At step 16, the web server prompts the user to control the dial on the controller to the third randomly selected position. In an embodiment, the web server displays on the web-enabled device the third randomly selected position. FIG. 19 illustrates an exemplary display displayed on the user's web-enabled device to show the user the third randomly selected position. In this example, the server has instructed the user to move the dial to the START TIMES position. In another embodiment the web server prompts the user to perform the third action for the selected user input.

Figure 20:
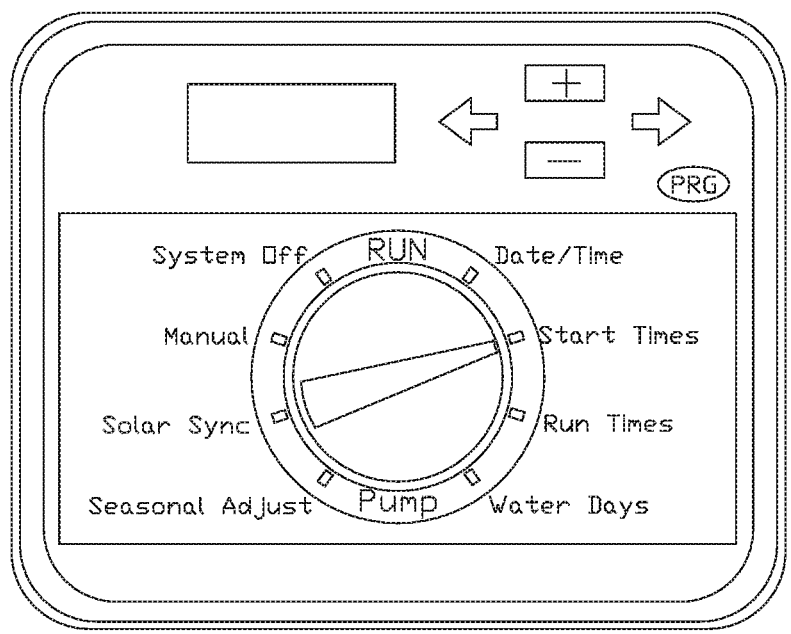
FIG. 20 illustrates an exemplary controller corresponding to FIG. 19, according to certain embodiments.

At step 17, the user manually rotates the control dial on the controller to the indicated position. FIG. 20 illustrates the dial on the controller that has been rotated to the third randomly selected position.

At step 18, the user confirms the manual positioning of the dial. The user may confirm the manual position is accurate by pressing ENTER or RETURN, or they may provide a button click such as selecting NEXT, SUBMIT, or another designated field. The user input may be confirmed by a mouse click, by using a stylus or finger on a touch screen, or voice commands. Any device feedback method currently known or developed in the future may be used to indicate that the control dial on the controller is in the third desired position. In an embodiment, the user presses ENTER or selects NEXT or SUBMIT to indicate that the control dial on the controller is in the third desired position. In one embodiment, the user selects NEXT displayed on their web enabled device. This action triggers the web server to poll the controller to request the dial position.

In another embodiment, no user input is needed to indicate that the control dial on the controller is in the third desired position. Instead, the web server waits an amount of time after prompting the user to place the user input in the randomly selected position. In an embodiment, the web server waits a predetermined amount of time. In another embodiment, the web server starts a timer. In an embodiment, the amount of time is approximately 10 seconds. In other embodiments, the amount of time is less than approximately 10 seconds. In another embodiment, the amount of time is greater than approximately 10 seconds. In a further embodiment, the amount of time is approximately 5 seconds, 10 seconds, 20 seconds, 30, seconds, 40 seconds, 50 seconds, or one minute.

In another embodiment, the web server scans for input from the controller indicating the position of the user input one or more times during a predetermined time frame. In another embodiment, the web server waits for a predetermined time duration before requesting the position of the user input from the controller.

The controller returns with a value indicating the position of the control dial. If the control dial is in the desired position, the web server continues to step 19. If the control dial is not in the desired position, the web server requests the user to reset the control dial position. In some cases, the web server may randomly select another position for the user to try. If the user controller dial position is not in the requested position after a pre-determined number of attempts, the authentication fails and the user is notified.

Figure 21:
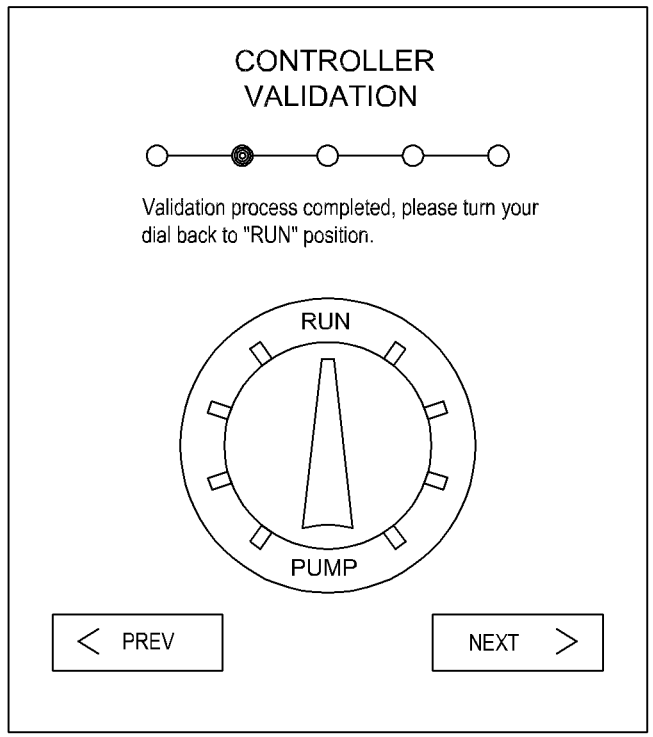
FIG. 21 illustrates an exemplary fourth display of a fourth controller input to indicate an end of the user authentication and authorization process of FIG. 14A-14E, according to certain embodiments.

At step 19, the server notifies the user that the validation is complete and instructs the user to set the control dial on the controller to a position that indicates the end of the process 1400. In an embodiment, the web server displays on the web-enabled device the position that indicates that the process 1400 is complete. FIG. 21 illustrates an exemplary display displayed on the user's web-enabled device to show the user the "end of authentication process" position. In this example, the server has instructed the user to move the dial to the RUN position. In another embodiment, the web server prompts the user to perform the "end of authentication process" action for the selected user input.

Figure 22:
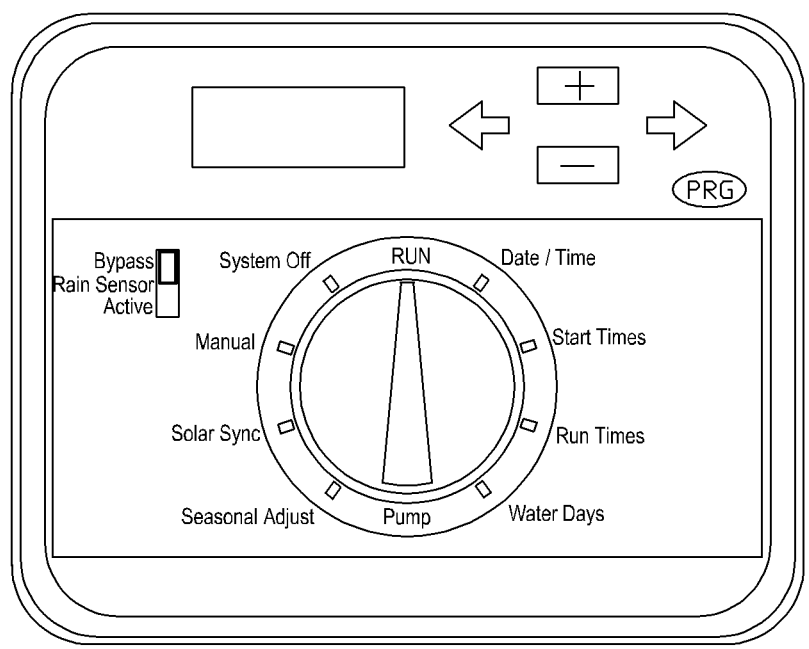
FIG. 22 illustrates an exemplary controller corresponding to FIG. 21, according to certain embodiments.

At step 20, the user rotates the dial on the controller to the RUN position. FIG. 22 illustrates the dial on the controller that has been rotated to the RUN position.

End Initial Account Set up and Customer-to-Device Authentication Process

At step 21, the user confirms the manual positioning of the dial. The user may confirm the manual position is accurate by pressing ENTER or RETURN, or they may provide a button click such as selecting NEXT, SUBMIT, or another designated field. The user input may be confirmed by a mouse click, by using a stylist or finger on a touch screen, or voice commands. Any device feedback method currently known or developed in the future may be used to indicate that the control dial on the controller is in the "end of authentication process" position. In an embodiment, the user presses ENTER or selects NEXT or SUBMIT to indicate that the control dial on the controller is in the "end of authentication process" position.

The exemplary authentication process 1400 illustrated in FIGS. 14A-14E uses three randomly selected dial positions to authenticate a user to be able to remotely control an Internet accessible controller that does not have a display that is responsive to the web server. In other embodiments, the authentication process 1400 can use more than three or less than three dial positions, switch positions, or button selections to authenticate the user. In other embodiments, the process 1400 can be used to authenticate a user for remote or local control of an Internet connected device. In an embodiment, the Internet accessible controller comprises a legacy controller. In an embodiment, the controller comprises a legacy controller. In an embodiment, the process 1400 illustrated in FIGS. 14A-14E can be used to authenticate a user for remote or local control of an Internet accessible controller, an Internet accessible device or a device that comprises a display.

Web Central

Web Central is a web application designed for use with the Hunter ProC®, or other compatible sprinkler controller device. The solution allows authorized users to view and control their ProC, or other compatible devices via the Web Central web application.

FIG. 16 illustrates a sprinkler controller device, such as the Hunter ProC. Users press buttons or turn the dial to operate the current device. No ability for to manage the device remotely exists at present.

Currently, when customers purchase a new ProC, or other compatible sprinkler controller device, there is no process for the customers to manage their particular new ProC, or other compatible device (or devices, if they have purchased more than one unit) remotely. Any person who has physical access to a particular ProC, or other compatible device, can start using his device by pressing the buttons or turning the dial on that device. In addition to selling ProC, or other compatible devices to new customers, there are a large number of ProC, or other compatible devices already in market.

Embodiments disclosed herein safely and securely allow a ProC owner to control his device remotely. The capability for that user to send and receive messages (or commands) from or to his devices via a web (or mobile) application is disclosed herein. Further embodiments disclosed herein enable the customer to prove his ownership of a particular ProC or other compatible device.

In an embodiment, an add-on (circuit board) for the ProC, called the 'WiFi-kit', which can be physically connected to the ProC and allows remote communication (messages) to be sent and received to that device via WiFi, using for example, but not limited to, a MQTT (Message Queue Telemetry Transport) protocol.

In another embodiment, X.509 certificates are used to validate identity. Certificates comprise of a set of cryptographically valid identifying strings; these include the certificate ID, the certificate private key and the certificate public key. In addition, each certificate contains other important validating metadata, such as the certificate issuing authority, date of issue, etc.

In another embodiment, public hosting services, such as, but not limited to, the Amazon Web Services (AWS) IoT set of cloud services, can be used for hosting.

Figure 23:
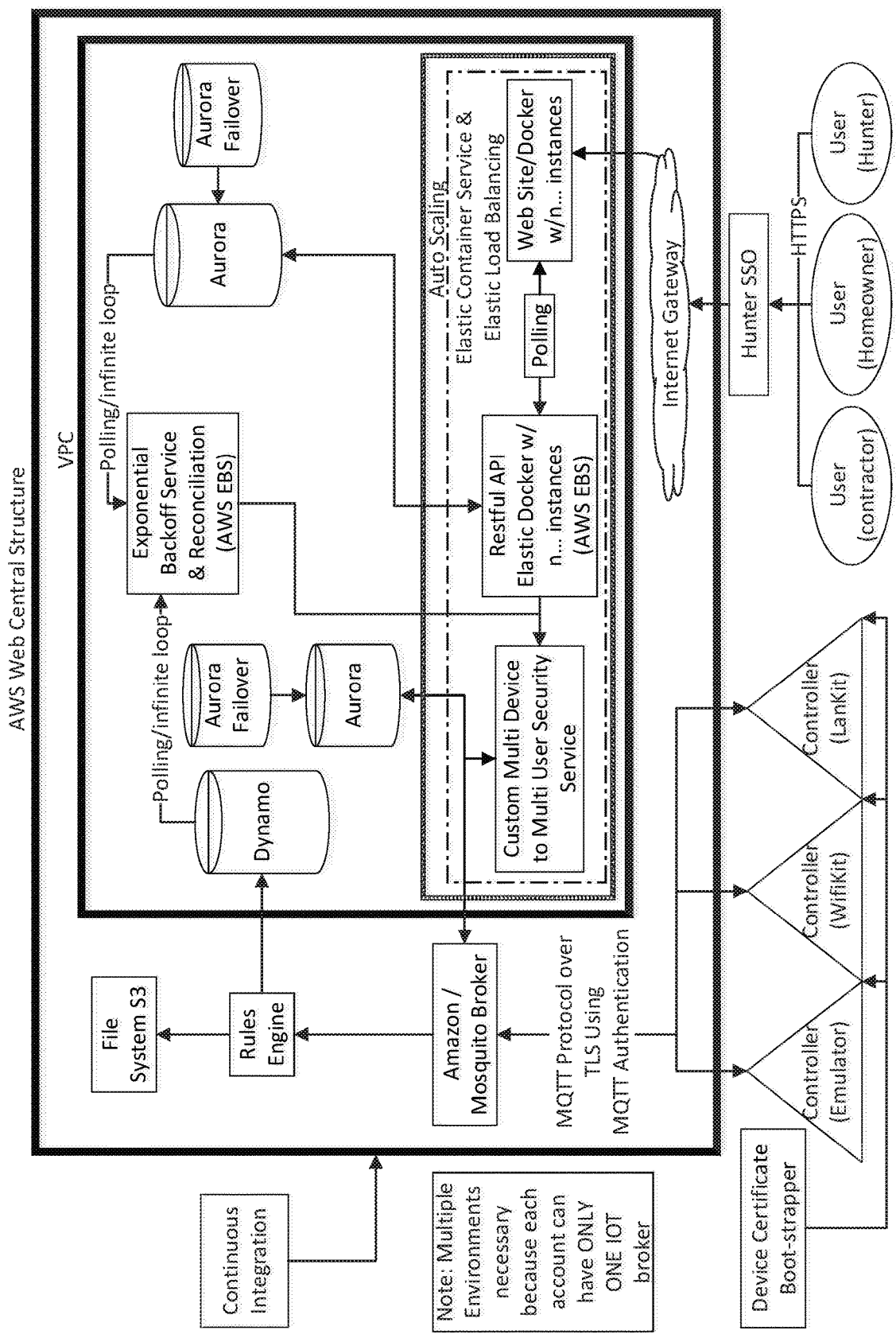
FIG. 23 illustrates the Web Central Architecture, according to certain embodiments.

FIG. 23 illustrates various components of the Web Central Architecture. Major components comprise the following:

1) User Interface—This section of the solution includes the UI/UX or Web Pages. These pages display ProC, or other compatible devices' information. They also allow for the user to input information which will allow that user to view and to control their devices remotely. A key aspect of these pages is the initial user-to-device authentication and authorization process. This process will be presented in greater detail herein. This component is represented as the 'Web Server' in FIG. 23.

2) User Authentication and Authorization—User validation information flows from the presentation layer (or web pages) through other solution components (or middleware) for various types of processing and validation. Authentication and authorization diagrams will be provided in later sections of this document. This component is represented as the 'Web Server', 'API Server' and 'Security Server' on FIG. 23. User data is stored in both Aurora databases.

3) Device Message Processing—Messages, or commands, flow from authorized users to their device and back. Secure message transmission is a key aspect of Web Central, and, as with User Authentication and Authorization, message flow throughout the solution will be explained and diagrammed in detail later in this document. This component is represented as the 'API Server' and the 'Retry Server' on FIG. 23. Data is stored in one of the Aurora databases and also in the DynamoDB database.

4) Device Authentication and Authorization—A key aspect of this product is proper device (ProC) authentication and authorization. As with users and messages, the process flow for achieving appropriate device authentication and authorization will be detailed later in this document. This component is represented by the 'Security Server' and 'Amazon/Mosquitto Broker' components shown in FIG. 23. Data is stored both Aurora database instances and also in the AWS database that is used by their AWS Broker server.

5) Telemetry (event) data long-term storage and processing—In addition to the immediate competitive benefit to particular Hunter ProC owners of being able to control their device via their mobile device, Hunter itself stands to benefit from analysis of aggregate ProC telemetry (event) data over time. Given this, another key aspect of Web Central is implementation of long-term device event data storage and analysis for presentation to Hunter business analysts. All solution components shown in FIG. 23 represent stages or states of device messages.

6) Device Certificate Bootstrapper—In order to automate the association of each device with a unique X.509 certificate, the team will create an application, which will provision, activate certificates with devices. This component is represented by the 'Device Certificate Bootstrapper' component in FIG. 23.

7) Overall Solution Architecture—A cloud IoT vendor (AWS) provides core service to support the Web Central solution architecture. The following AWS cloud services are being used in the Web Central Solution:

IoT (device activities)—AWS IoT Broker for device message coordination, device security (via certificates and IoT device policies) and rules for copying device message data into other AWS data stores.

Database—AWS RDS Aurora for user session state information, for user and device metadata, for user-to-device ownership mapping, for device message deliver verification and for dial position state information.

Database—AWS DynamoDB for device message verification.

Compute (business logic)—AWS EC2 virtual machines to host the solution components (web site and business logic components).

Security—AWS Networking components to secure the solution components within an AWS VPC, AWS subnet(s), AWS security group(s), AWS Internet Gateway, AWS Route Tables.

Security—AWS IAM Users, Roles and Policies to secure authorized users after they've first been authenticated with the Hunter SSO.

Scalability—AWS Load Balancer, AWS Cloud Watch (alarms) and other services.

A set of custom AWS component configurations are represented by configuration files and are generally of the data type JSON files. These custom configurations are an important aspect of the Web Central solution and are part of the solution source control files.

The components comprise JavaScript code files. The primary coding language used for the Web Central solution is JavaScript, implemented as node.js. Node.js is a version of JavaScript in which the code can run (execute) on either a client, such as a web browser or a server, such as on an Ngnix web server. There are a large number of node.js modules (or libraries), which have also been used in the development of the solution.

Each of the four custom Web Central components or servers is hosted on one more AWS EC2 virtual machine instances.

Web Central Web Server—this component generates the Web Central web site pages.
  Provides the user interface for authorized users to interact with their ProC or other compatible devices.
  Sets up and maintains session state for each series of user interactions in the system.
Web Central API Server—this component connects, validates, formats, and verifies information sent to or from the other components in the system. It provides the following functionality:
  Constructs the ProC or other compatible devices commands from the user's input. It translates the input data from its native format (JSON) to a format that the ProC or other compatible devices can process (hex). An example of the ProC command interface is shown in Table 1.
  Connects the other components in the system to the user interface (web site) by using the https request/response pattern
  Connects the web site to the security components of the system to provide appropriate user-to-device authentication and authorization.
  Sends a copy of all device messages to the database for persistence, reconsolidation, retry and eventual aggregate analysis.
Web Central Security Server—this component validates system security within the AWS-deployed components. Although the AWS server is used as an example, this component is not limited to the AWS server and may otherwise be used with another cloud based server, or a locally hosted server architecture.
  Verifies that the user attempting to login is 'known' to the AWS system.
  Associates known users with AWS IAM roles, so that the incoming user has appropriate permissions to access Web Central resources, which have been deployed on AWS, services.
  Associates one or more devices to a particular user after successful completion by that user for their device using the dial-verification process. Stores information about this user-to-device mapping into the AWS Aurora database
  Adds data to an AWS Aurora database with device metadata, such as model name and serial number as the user completes the dial verification process.
  Enforces security rules on the number of attempts a user has to correctly complete the dial verification process
Web Central Retry Server—this component attempts to reconcile messages that have been attempted to have been sent to a device by a user with messages that the device received and to attempt to re-send messages as needed.
  Polls the device message database, AWS DynamoDB and attempts to 'match' any device message there with a corresponding message in the user message database, AWS Aurora.
  Updates field in AWS Aurora message if messages are matched in both systems, to set a datetime value for 'FinalMessageDeliveryTime' in AWS Aurora and then delete device message from AWS DynamoDB.
  Polls the user message database, AWS Aurora to find messages which have no entry in the 'FinalMessageDeliveryTime' field and meet two other criteria. The first criterion is that the field 'NumberOfDeliveryAttempts' are be less than 5. The second criterion is that the 'OriginalSendTime' should be less than 10 minutes from the current time. If all these of these conditions are met, then the Retry Server will attempt to publish the message to device again and will increment the 'NumberOfDeliveryAttempts' value by one.
  Reconciles unacknowledged messages via a linear or exponential back off time-based algorithm (i.e. all unacknowledged messages are resent at 1 minute from initial attempt to send, then at 2 minutes, etc.) up until three conditions above are met.
Web Central Common Module—this private node.js module, which is physically copied into each of the other four Web Central Server components for production deployment provides the core of the solution security within the AWS system, that is, AFTER the user has successfully authenticated to the external SSO system.
  NOTE: This module is not shown on the architecture diagram, FIG. 23, as a copy of it is wholly included in each of the four Web Central Servers.
Device Certificate Bootstrapper Application—this application, serves the purpose of provisioning and associating X.509 certificates to ProC or other compatible devices Wifi-kits.
  Works in conjunction with a local (on premise) Certificate Authority Hierarchy. This local Hunter CA would serve as the first level of verification for X.509 certificates that would eventually be associated to devices. The local CA will issue certificates destined for devices via a custom certificate template, which includes the necessary metadata, i.e. device type, serial number, etc.
  Uploads Hunter certificates via the AWS IoT SDK to the AWS IoT endpoint (URL) for the production AWS IoT solutions account. This is for second level of verification via the AWS CRS certificate issuing process. This step adds a second CA to each certificate and allows devices with these certificates to communicate with a particular AWS IoT Broker Service via JSON-formatted messages sent over the MQTT protocol.
  Activates authorized certificates so they can be used in the system
  Associates certificates with devices via the device serial number. IMPORTANT: Private key value from associated certificate is physically copied (burned in) to the WiFi-kit of the associated ProC or other compatible devices.

Creates logical representation of each ProC or other compatible device in AWS IoT (called and IoT Thing) and populated device metadata values, device type, serial number, etc.

Figure 24:
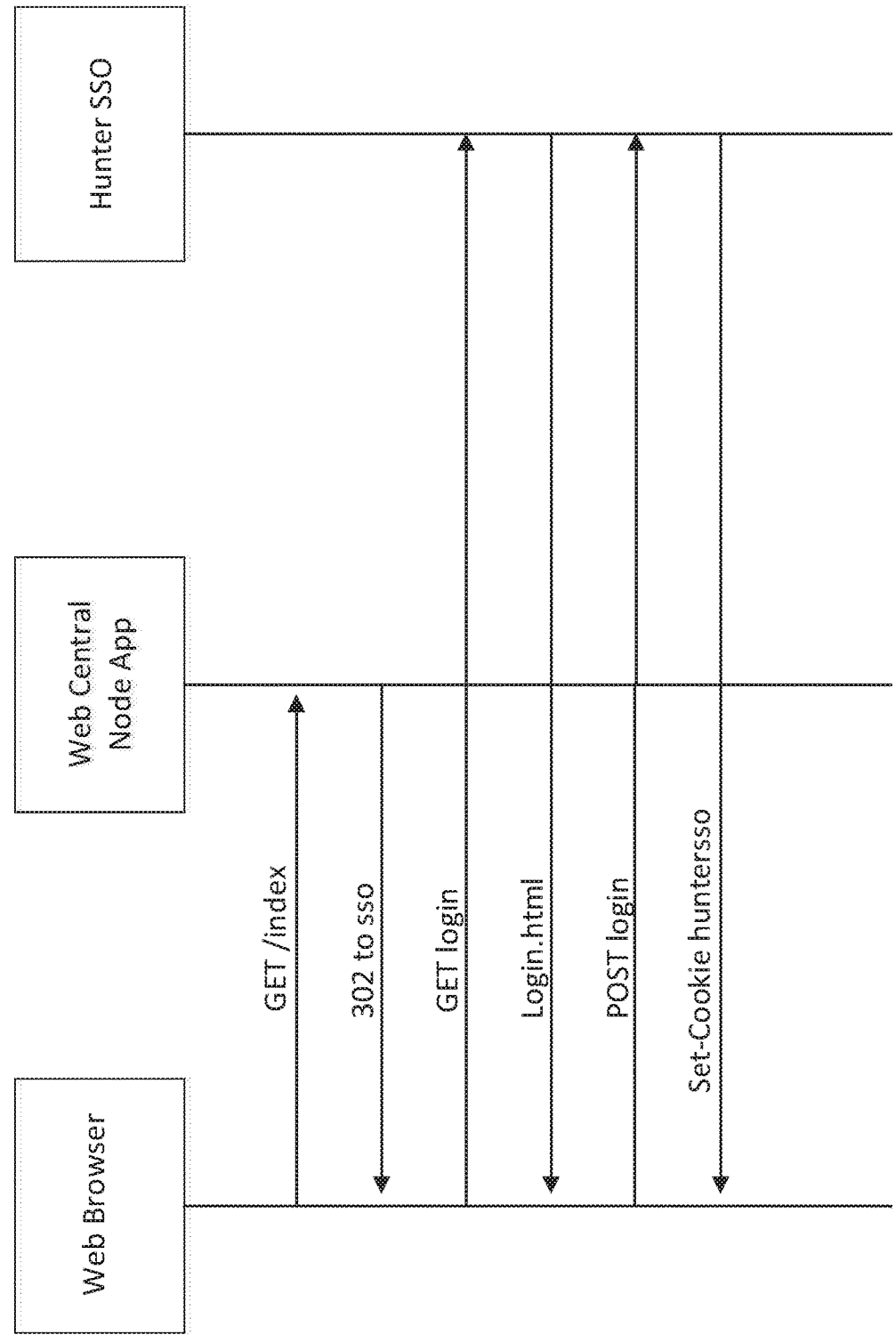
FIG. 24 is a flow diagram illustrating an authentication and authorization flow, according to certain embodiments.

User-to-Device Authentication in Detail/"Dial Dance"

a. Understanding the User Interface and Data Flow for the User-to-Device Authentication Process FIG. 24 details the authentication and authorization flow for a user to login and to become authenticated as a valid user by the single sign on system for the Web Central application.

In one embodiment, the process shown involves three components. The user first navigates to the main Web Central home page. What happens next depends on whether that user is new to the system or has previously logged in successfully.

If the user is new, then that user's browsing session will NOT contain a user authentication token (or cookie). The Web Central application checks for the presence of a valid cookie for that user, if no cookie is found, then that user is re-directed to another component. This component is the SSO (single-sign on) service. Here the user registers by entering their valid email address and password (which they will have received via their email prior to starting this process) into the two text boxes on the 'Sign-in' page. After the information is received, it is then sent back to the Web Central components for validation via the service and customer data, which is stored in a database associated with the Web Central system.

If the user information is validated, then the Web Central system passes that fact back to the SSO component. The SSO component then issues a user token, or cookie, which is attached to that user's browser session.

The user can then move to the next step in the process, which is to perform the ProC dial verification steps, which will associate that user to that device on successful completion of the process, which is described in detail herein.

In the event that the user already has one or more devices associated to their account in the (i.e. they've previously successfully performed the device verification), then after they login with their valid email and password credentials, they will receive a user session token and proceed directly to interacting with their ProC controller.

b. Understanding the End-to-End Data Flow for User to Device Authentication

Figure 25:
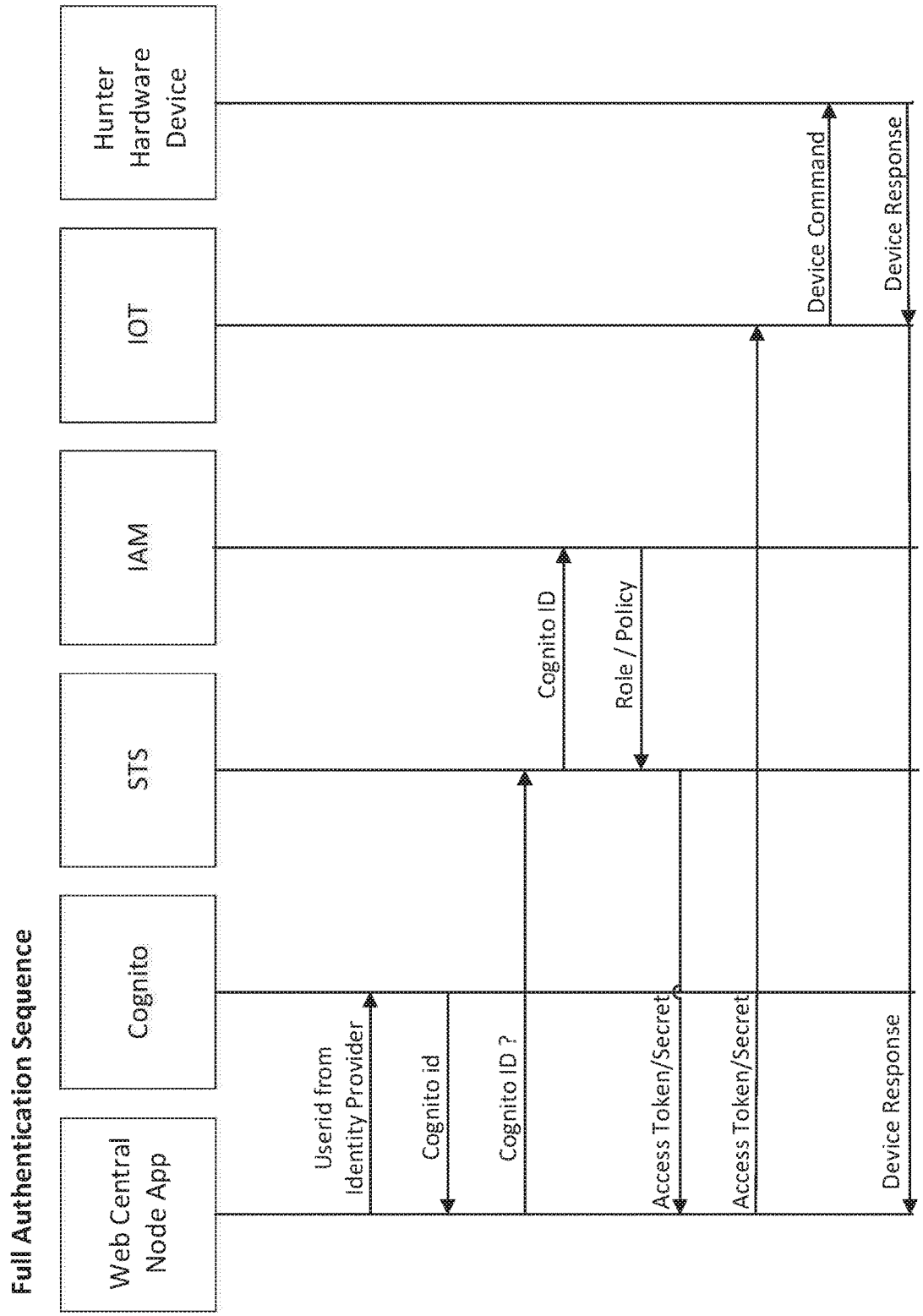
FIG. 25 is a flow diagram illustrating the an authentication sequence, according to certain embodiments.

In FIG. 25, an embodiment of the full authentication sequence (i.e. user to device) is detailed. Of note is that the STS (security token exchange service) is an internal AWS service which is invoked via the AWS SDK call to the STS object and to invoke the 'assume (AWS)Role' method on that object for the appropriate IoT Role. In code, this is written as follows STS.assumeRole(iotRole);

It is this call that exchanges the SSO-generated token (stored as a cookie) in the user's session for temporary AWS IAM User credentials. These credentials briefly initiate with open permission, but are restricted to permission to send messages to those devices that are associated with that particular user. The method of association is also shown in FIG. 25.

c. Presenting the User-to-Device User Interface Flow

A key aspect of Web Central is the implementation of the initial (new) user-to-device authentication and authorization. Described herein is one embodiment of a sequence that the user will perform on the Web Central application and also the physical manipulation of the user's ProC or other compatible device, by physically turning (or setting) the dial settings to match those requested by the Web Central web application. The description is directed to a Hunter ProC controller, but may also apply to any other compatible device.

Step 0a—Sign In to SSO

In this step, the user enters their valid email and password.

Step 0b—Add controller

Figure 26:
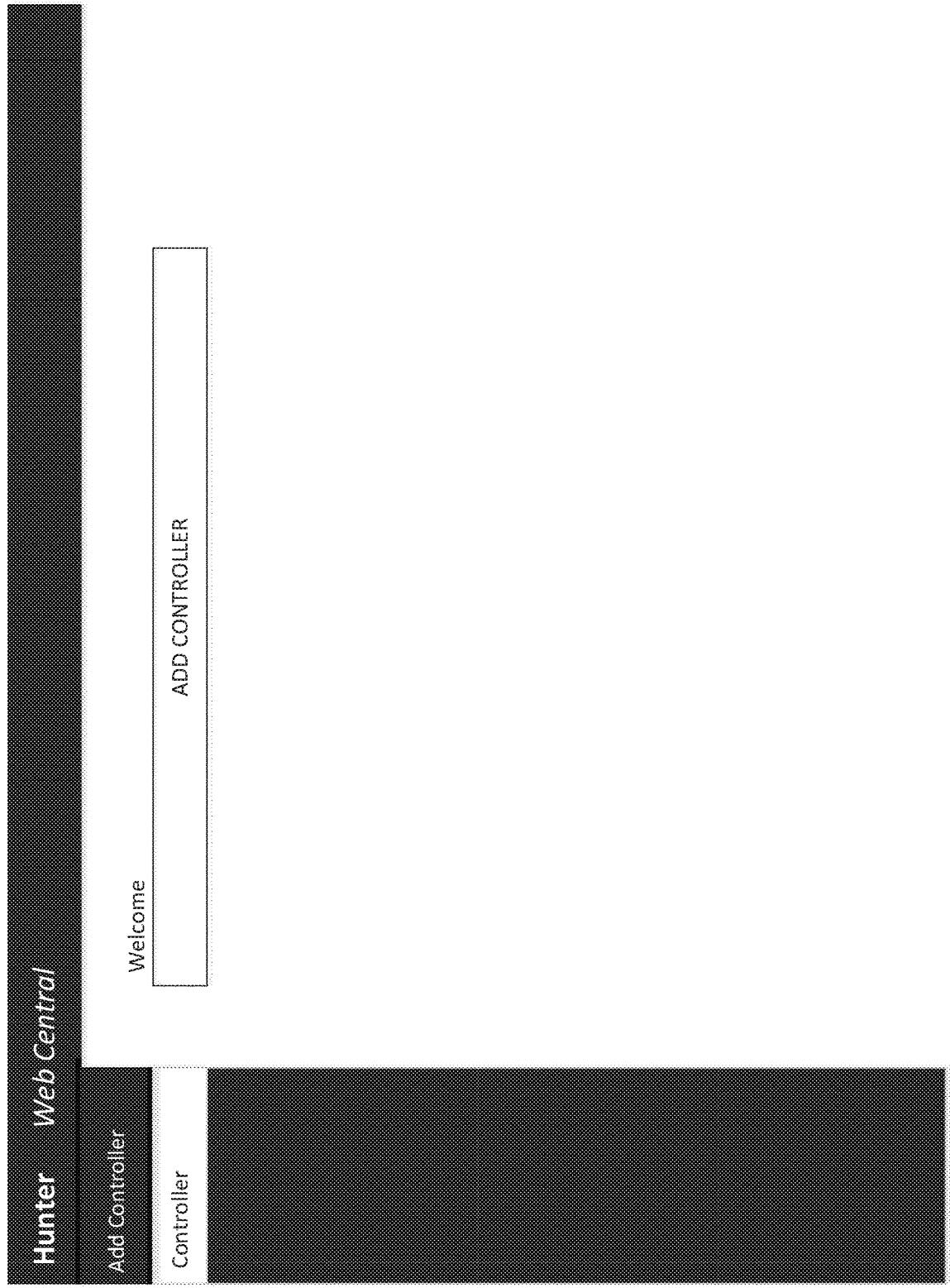

In this step, the user has been redirected to web page, an example of which is shown in FIG. 26. The user selects the large white 'Add Controller' button to start the user-to-device ProC dial validation process.

Step 1—Enter Device Name and Serial Number

Figure 27:

Referring to FIG. 27, in this step, the user enters the name to use for the ProC unit. Name values can be strings, which consist of letter, numbers or characters. Web Central uses UTF-8 encoding, which means non US-English characters are supported in the 'Controller Name' field.

The user then types in the serial number of his ProC controller. Users obtain the ProC device serial number at the time of purchase. When the user has entered this information, the user selects the 'Next' button.

Step 2a—Part 1 of the 3-Part Device Ownership Dial Position Validation

Figure 28:
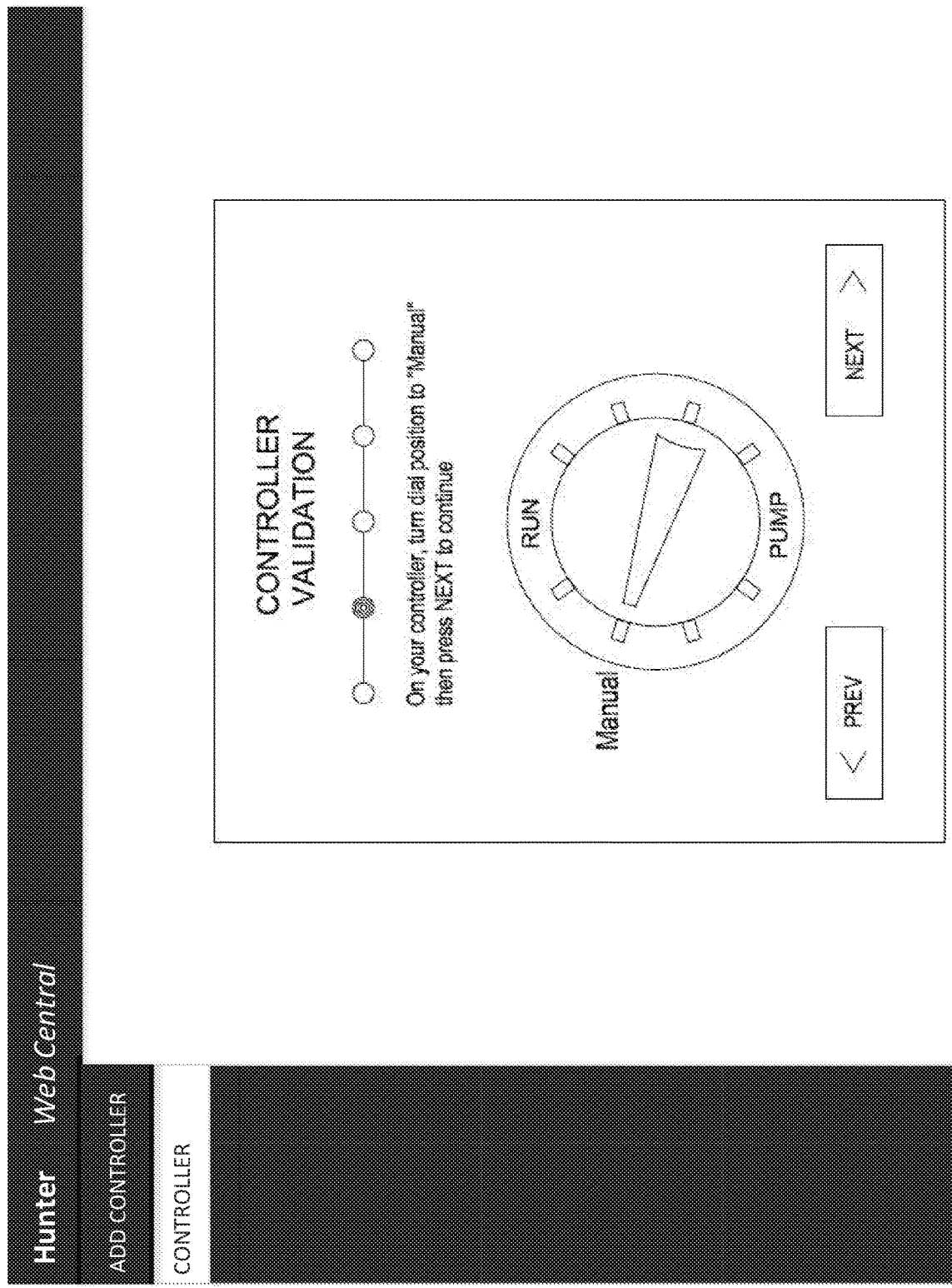

Referring to FIG. 28, the user is presented with a first controller validation screen. The user is instructed to turn the physical dial on their ProC device to one of the possible positions (position generation is randomized via the Web Central API Server). The user completes three turns, or three successful dial position verification tasks in order to validate that the user is the owner of that particular ProC Device.

The user sets the dial position on their ProC controller to the position shown on the screen. In this example illustrated in FIG. 28, the dial position requested is 'Manual'. After the user has turned the device's physical dial to this position, the user then selects the 'Next' button on the bottom right of web page to request the next dial position for the verification process.

If the user sets the dial position to a value other than the one that was requested, then the user is presented with the 'Controller Setup' screen (FIG. 27) and re-enters the 'Controller Name' and 'Serial Number' and then selects 'Next' to re-start a new dial verification session.

Step 2b—Part 2 of the 3-part device ownership dial position validation

Figure 29:
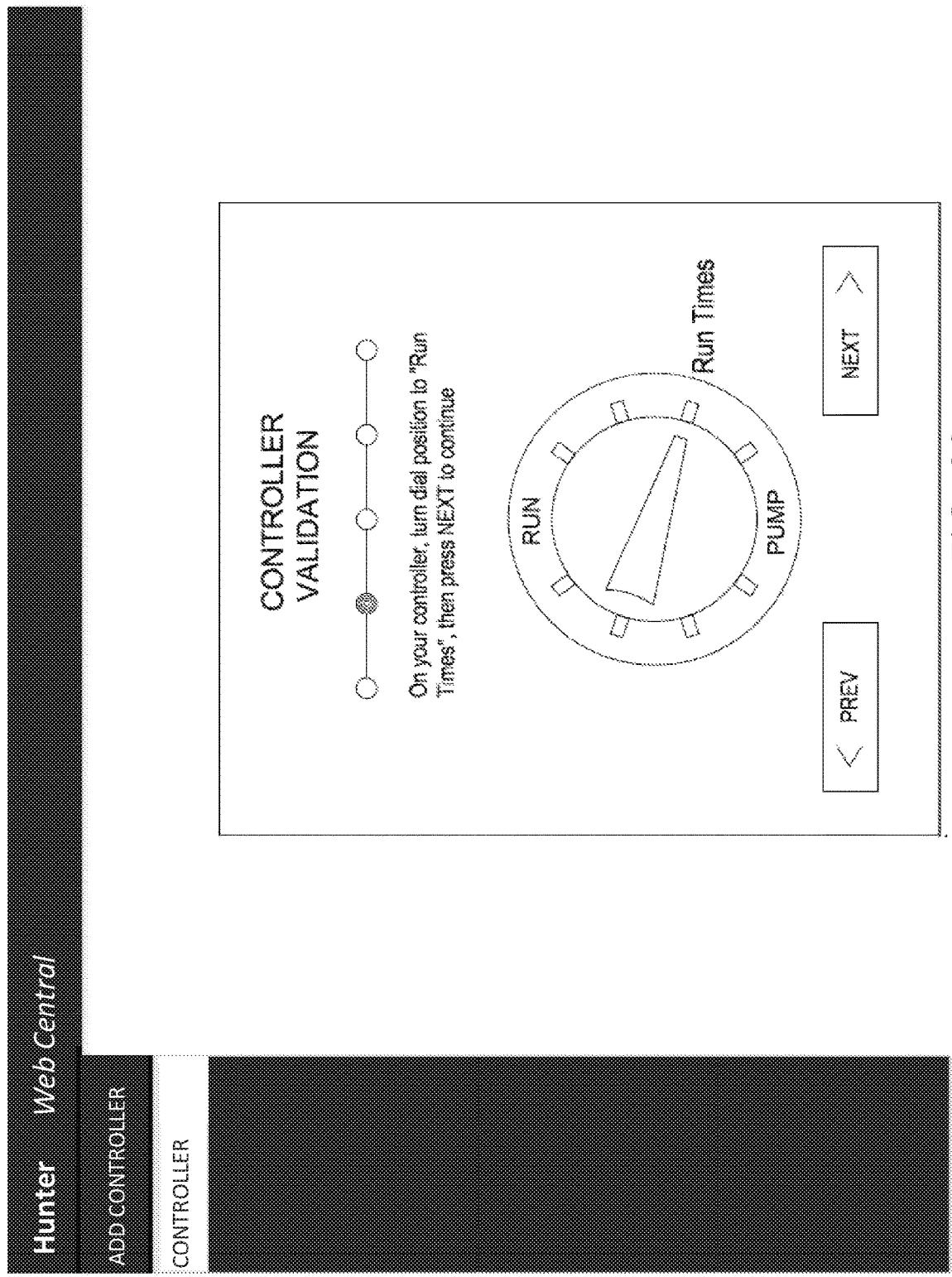

If the user completed the previous step successfully, then he will be presented with a second controller validation screen such as the one illustrated in FIG. 29. The user is instructed to turn the physical dial on their ProC device to one of the possible positions (position generation is randomized via the Web Central API Server). As above, after the user is presented with this screen, the user then turns the device dial to the requested position, in this case 'Run Times', as illustrated in FIG. 29. After the user has done this, then the user selects the 'Next' button on the web application to move to the final dial validation step.

As with the first dial verification step, if the user puts the device dial in an incorrect position, then the user will be presented with the device setup screen (FIG. 27) and will have to enter the device name and serial number to begin a new 3-part dial verification session.

Step 2c—Part 3 of the 3-part device ownership dial position validation

Figure 30:
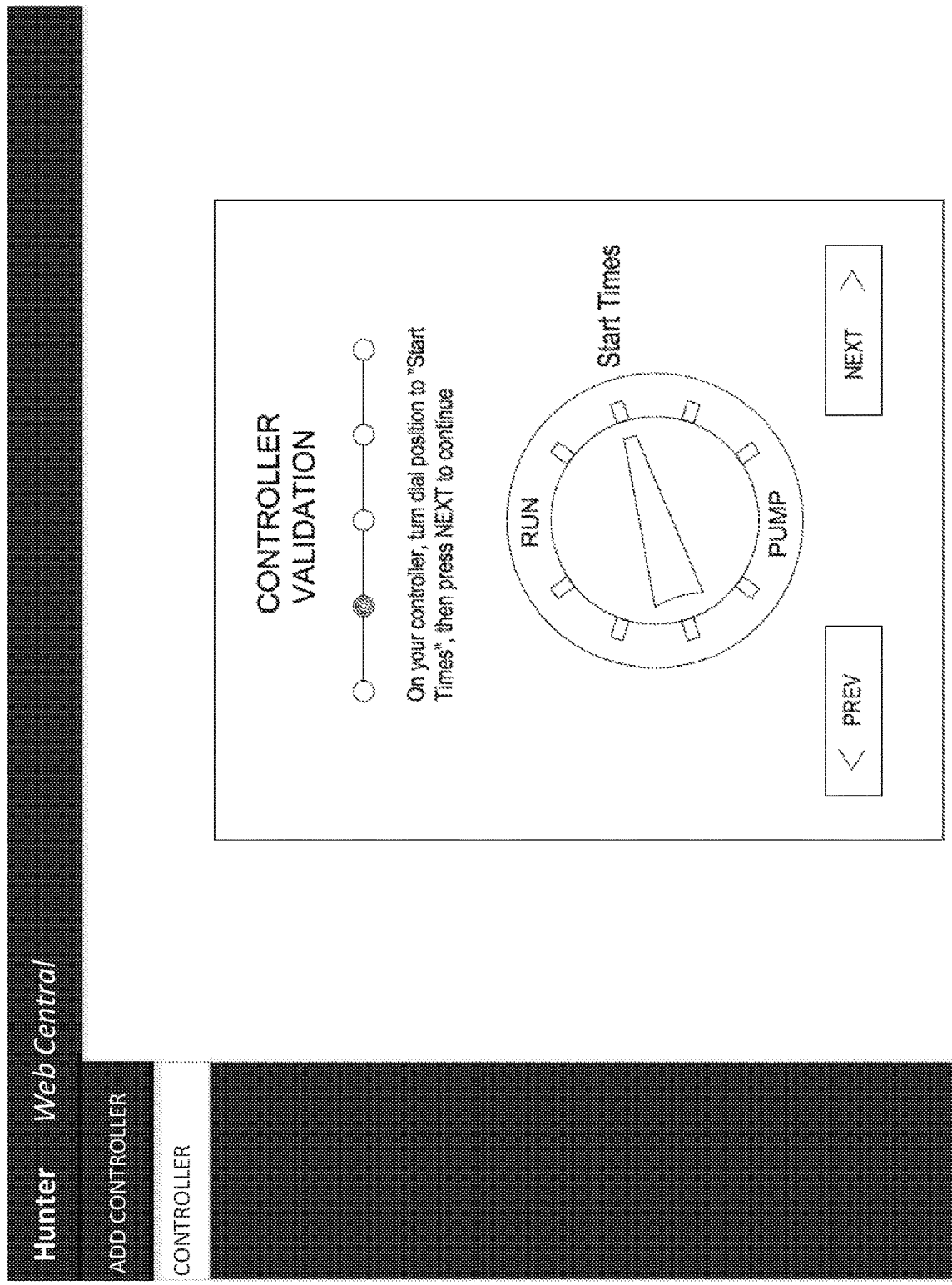

If the user completes the previous two-step successfully, then he will be presented with a third validation screen such as the one illustrated in FIG. 30. The user is instructed to turn the physical dial on their ProC device to one of the possible positions (position generation is randomized via the Web Central API Server). As above, after the user is presented with this screen, the user then turns the device dial to the requested position, in this case 'Start Times'. After the user has done this, then the user selects the 'Next' button to move to the final dial validation step.

Step 2d—Completing the Controller Validation

Figure 31:
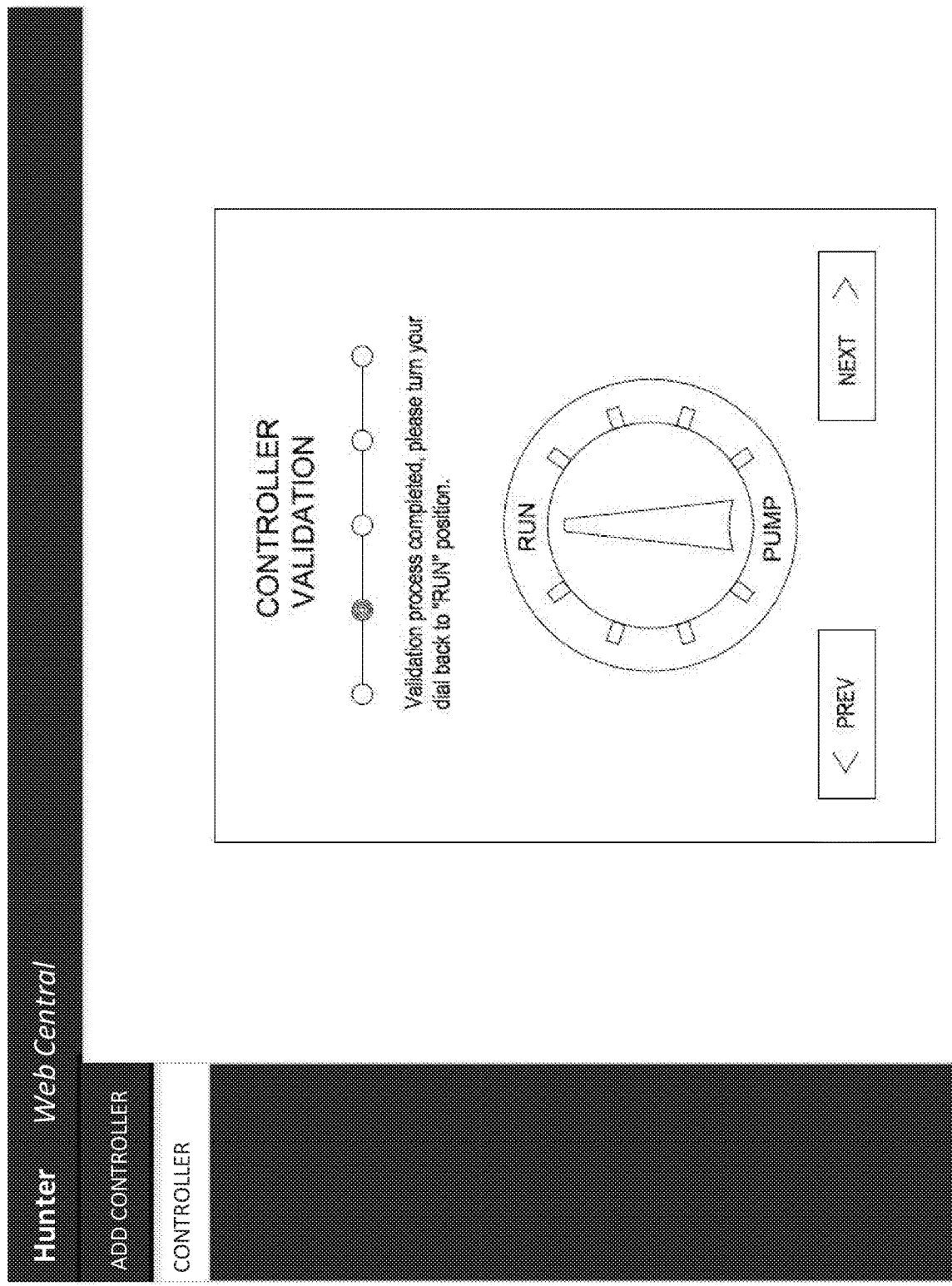

After three successful dial verification sessions, the user will be presented with the message 'Validation process completed, please turn your dial back to 'RUN' position, as illustrated in FIG. 31. To complete the process, the user turns his ProC dial to the 'RUN' setting and then selects the 'Next' button on the web application.

Step 3—Setting Up Ownership

Referring to FIG. 32, in this step, the user selects in the appropriate radio button to indicate their level of ownership of ProC controller. Exemplary choices are 'owner', 'manager' or 'setup admin'. After the user selects the appropriate level of ownership, the user selects the 'Next' button to move to the next portion of the controller setup process.

Step 4—Adding Controller Address

Figure 33:
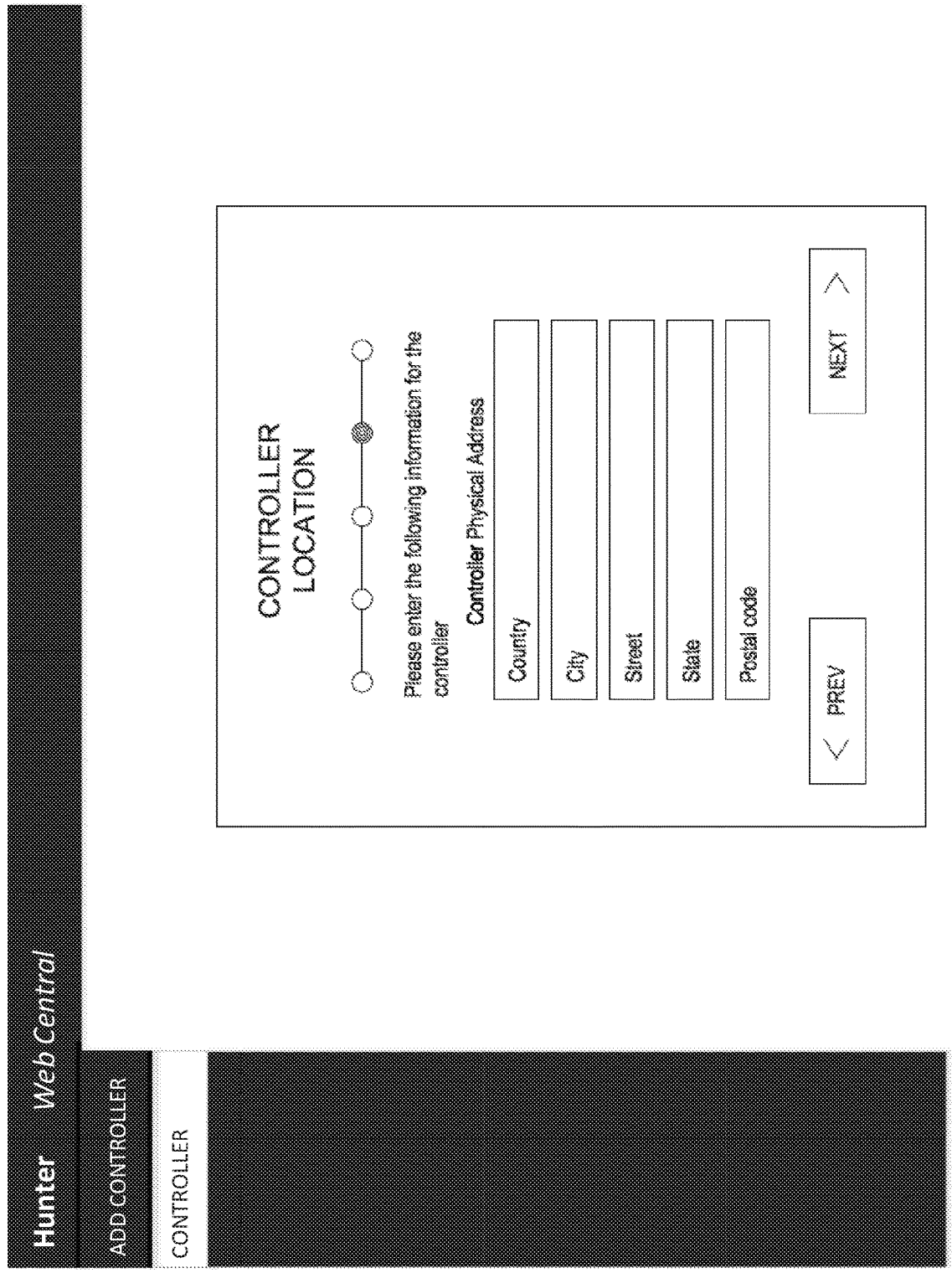

In this step, the user fills in the controller address information (country, street, city, state and zip code), and then the user selects the 'Next' button to complete the controller setup process. One embodiment of a controller location screen is illustrated in FIG. 33.

Web Central Security Architecture

Figure 34:
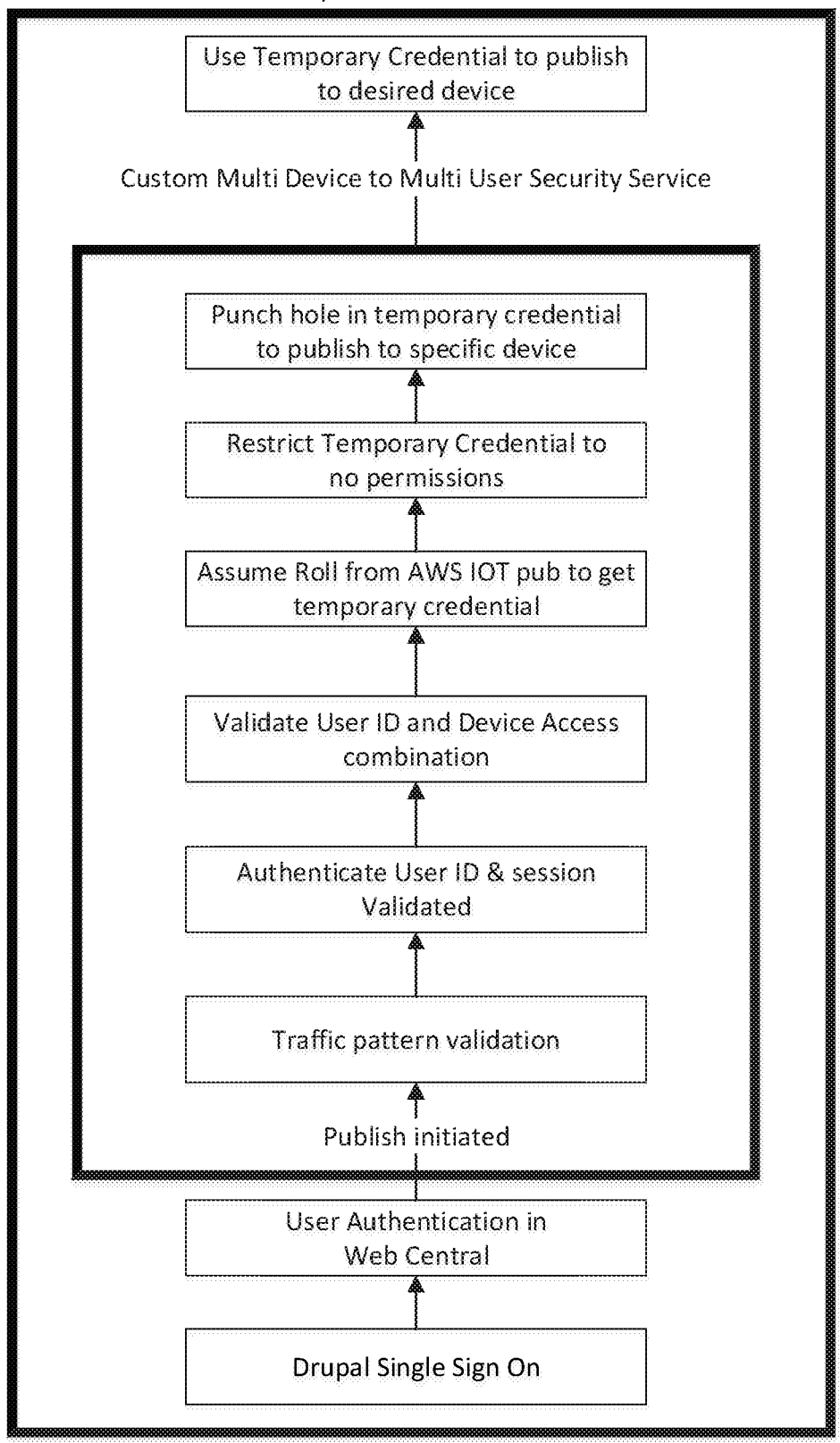
FIG. 34 illustrates a user-to-device end-to-end authentication and authorization model, according to certain embodiments.

An embodiment of the design of the Web Central user-to-device end-to-end authentication and authorization model is shown in FIG. 34.

A security service, implemented as Web Central Security Server, implements the association between particular authenticated and authorized Web Central users to their authenticated and authorized AWS IoT ProC or other compatible devices. In other words, the Central Security Server connects users-to-devices.

One embodiment of the architecture for this security solution that provides this connection is shown in FIG. 34. The diagram is read from bottom to top; in other words, the process begins with a potential Web Central user, attempting to authenticate via (re-directed) login to the SSO web site.

The outer rectangle represents the complete process; the inner rectangle represents the design for the functionality of the Web Central Security server service.

Figure 35:
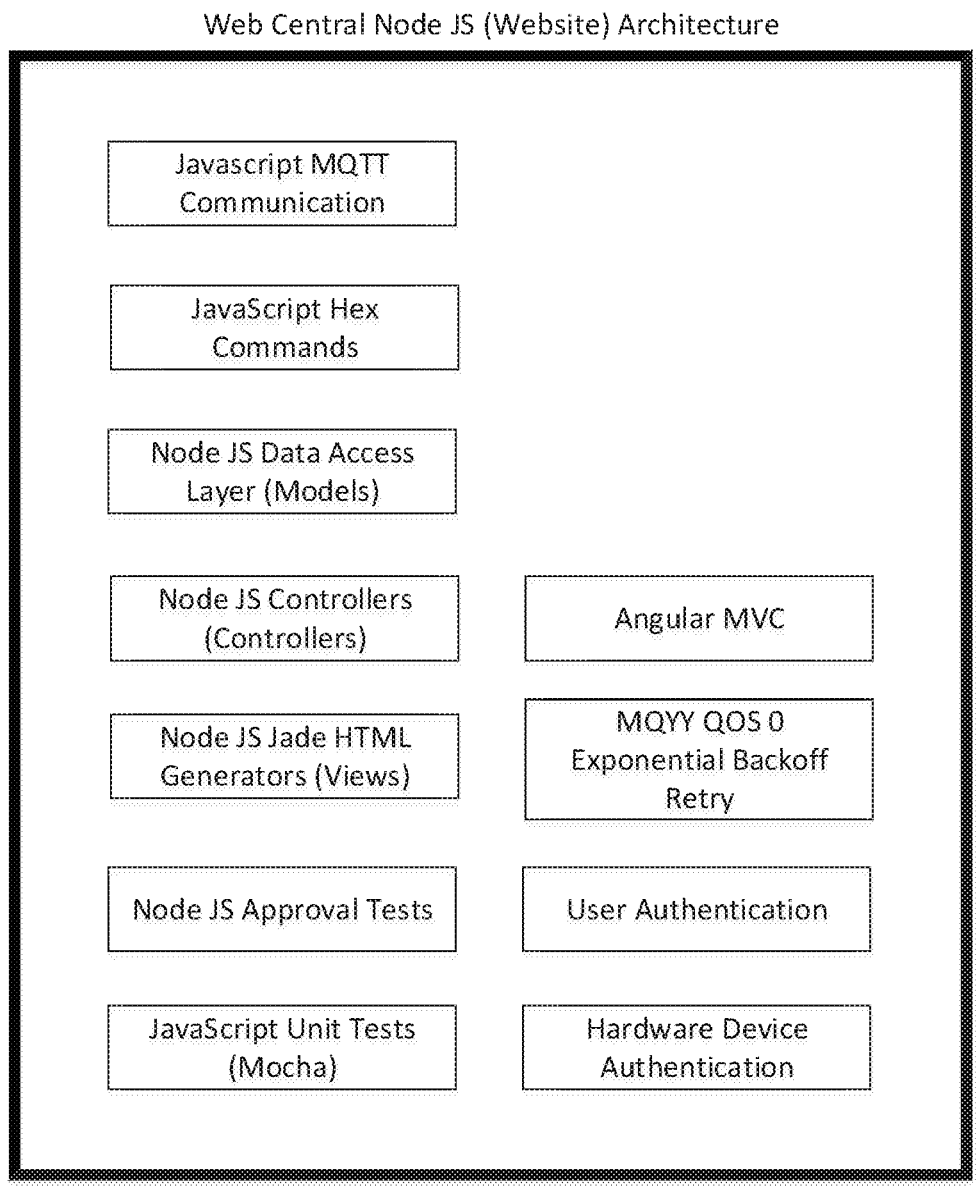
FIG. 35 illustrates exemplary website architecture, according to certain embodiments.

The core-programming paradigm used is JavaScript on both the web server (as node.js) and on the browser clients (as JavaScript). There are a large number of node.js components, which are part of the Web Central solution components, one embodiment of which is illustrated in FIG. 35.

TABLE 1

EXAMPLE PROC COMMAND STRUCTURE - FOR COMMAND 'GETGLOBALS'
01H - Set Field Controller System Globals
(Time, Date, %, ClikDelaySetting)
Transmits to field controller(s), system global information from a Central to all Field Controllers for system event operation. The Time-of-Day and Midnight components will be expressed in 24-hour format. The new values become effective immediately. This command would normally use the global field controller address of 1940H. Addressing a single controller would be an alternate method.

| | |
|---|---|
| Command: | <01H><Hours><Minutes><Seconds><MM><DD><<YYY>><SysDcHour> <FcpDcHour><Options> <CurEtap><MaxEtap><Response><ReportInterval> <<GblSeasAdj>><StackMode><SsPrgThold> <SsgSsPrgThold><ClikDelay> |
| Hours: | Sets value of hour. Range is 0 to 23 |
| Minutes: | Sets value of the minute of the hour. Range is 0 to 59 |
| Seconds: | Sets value of the second of the minute. Range is 0 to 59 |
| MM: | Sets value of calendar month. Range is 1 to 12 |
| DD: | Sets value of calendar date. Range is 1 to 31 |
| YYYY: | Sets value of calendar year. Range is 2013 to 2063. |
| SysDcHour: | N/A (00) |
| FcpDcHour: | N/A (00) |
| Options: | Sets up global options for the controller. Bit values are as follows: |
| | bit 0: Set if in 24-hour mode. Clear if in 12-hour mode. |
| | bit 1-4: Reserved for internal use by controller and will be ignored. |
| | bit 7-5: 000 - English |
| CurEtap: | N/A (00) |
| MaxEtap | N/A (00) |
| Response: | N/A (00) |
| ReportInterval: | N/A (00) |
| GblSeasAdj: | Value of Global Seasonal Adjust. Valid values are 5 to 300. Default = 100%. |
| StackMode: | N/A (00) |
| SsPrgThold: | N/A (00) |
| SsgSsPrgThold: | N/A (00) |
| ClikDelaySetting: | Sets value of Clik Delay duration in increments of days. Range is 0 to 7 days |
| | 0 = Clik Delay is OFF (Disabled) |
| | 1 = 1 day (24 Hrs.) |
| | 2 = 2 days (48 Hrs.) |
| | 3 = 3 days (72 Hrs.) |
| | 4 = 4 days (96 Hrs.) |
| | 5 = 5 days (120 Hrs.) |
| | 6 = 6 days (144 Hrs.) |
| | 7 = 7 days (168 Hrs.) |
| Response: | ACK |
| | NACK (Error Code 1) if any underlined parameters are out of range |

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding whether these features, elements, and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system to authenticate a controller, the system comprising:
    a controller configured to communicate over the Internet, the controller comprising a user interface with at least one switch that is mounted to the controller, the at least one switch including an actuatable control, the at least one switch configured to be manually placed in a plurality of positions by applying a mechanical force to the actuatable control; and
    a web server comprising at least one processor and memory storing an indication for each position of the plurality of positions of the at least one switch and instructions executable by the at least one computer processor, the web-server configured to interact with a web-enabled device to cause the web-enabled device to display prompts to a user, the controller unable to display the prompts to the user from the web server, the at least one computer processor configured to execute the instructions to cause the at least one computer processor to:
        (i) randomly select a position of the plurality of positions of the at least one switch;
        (ii) cause the web-enabled device to display a prompt to position the at least one switch to the randomly selected position;
        (iii) receive an indication from the controller of the position of the at least one switch;
        (iv) compare an indication of the randomly selected position stored in memory with the indication of the position from the controller; and
        (v) initiate a next action in response to the comparison associated with the randomly selected position.

2. The system of claim 1 wherein the next action comprises authenticating the controller.

3. The system of claim 1 wherein the next action comprises randomly selecting a second position of the plurality of positions of the at least one switch.

4. The system of claim 3 wherein the at least one computer processor is further configured to execute the instructions to cause the at least one computer processor to:
    cause the web-enabled device to display a second prompt to position the at least one switch to the second randomly selected position;
    receive a second indication from the controller of the position of the at least one switch;
    compare an indication of the second randomly selected position stored in memory with the second indication of the position from the controller; and initiate a third action in response to the comparison associated with the second randomly selected position.

5. The system of claim 4 wherein the third action comprises authenticating the controller.

6. The system of claim 4 wherein the third action comprises:
   randomly selecting a third position of the plurality of positions of the at least one switch;
   causing the web-enabled device to display a third prompt to position the at least one switch to the third randomly selected position;
   receiving a third indication from the controller of the position of the at least one switch;
   comparing an indication of the third randomly selected position stored in memory with the third indication of the position from the controller; and
   initiating a fourth action in response to the comparison associated with the third randomly selected position.

7. The system of claim 6 wherein the fourth action comprises authenticating the controller.

8. The system of claim 1 wherein the web server and the user interact with the controller and the web-enabled device to authenticate the controller through a series of actions.

9. The system of claim 8 wherein the series of actions are repeated for a determined number of times to authenticate the controller.

10. The system of claim 8 wherein the series of actions includes steps (i)-(v).

11. The system of claim 1 wherein steps (i)-(v) are repeated for a number of times to authenticate the controller.

12. The system of claim 1 wherein the controller is one of a landscape controller, an irrigation controller, and a lighting controller.

13. A computer-implemented method to authenticate a controller that is configured to communicate over the Internet, the controller comprising a user interface with at least one switch that is mounted to the controller, the at least one switch including an actuatable control, the at least one switch configured to be manually placed in a plurality of positions by applying a mechanical force to the actuatable control, the computer-implemented method comprising:
   randomly selecting a position of the plurality of positions of the at least one switch;
   causing a web-enabled device to display a prompt to position the at least one switch to the randomly selected position, the controller unable to display the prompt;
   receiving an indication from the controller of the position of the at least one switch;
   comparing an indication of the randomly selected position stored in memory with the indication of the position from the controller; and
   initiating a next action in response to the comparison associated with the randomly selected position.

14. A system to authenticate a controller, the system comprising:
   a controller configured to communicate over the Internet, the controller comprising a user interface including a plurality of switches mounted to the controller, each of the switches including an actuatable control, each of the switches configured to be manually placed in more than one position by applying a mechanical force to the actuatable control; and
   a web server comprising at least one computer processor and memory storing an indication for each position of a plurality of positions and instructions executable by the at least one computer processor, wherein the plurality of positions include each position of the more than one position of each switch of the plurality of switches, the web server configured to interact with a web-enabled device to cause the web-enabled device to display prompts to a user, the controller unable to display the prompts to the user from the web server, the at least one computer processor configured to execute the instructions to cause the at least one computer processor to:
   (i) randomly select a position of the plurality of positions;
   (ii) cause the web-enabled device to display a prompt to position a switch associated with the randomly selected position to the randomly selected position;
   (iii) receive an indication from the controller of the position of the switch associated with the randomly selected position;
   (iv) compare an indication of the randomly selected position stored in memory with the indication of the position from the controller; and
   (v) initiate a next action in response to the comparison associated with the randomly selected position.

15. The system of claim 14 wherein the next action comprises authenticating the controller.

16. The system of claim 14 wherein the next action comprises randomly selecting a second position of the plurality of positions.

17. The system of claim 16 wherein the at least one computer processor is further configured to execute the instructions to cause the at least one computer processor to:
   cause the web-enabled device to display a second prompt to position a switch associated with the second randomly selected position to the second randomly selected position;
   receive a second indication from the controller of the position of the switch associated with the second randomly selected position;
   compare an indication of the second randomly selected position stored in memory with the second indication of the position from the controller; and
   initiate a third action in response to the comparison associated with the second randomly selected position.

18. The system of claim 17 wherein the third action comprises authenticating the controller.

19. The system of claim 17 wherein the third action comprises:
   randomly selecting a third position of the plurality of positions;
   causing the web-enabled device to display a third prompt to position a switch associated with the third randomly selected position to the third randomly selected position;
   receiving a third indication from the controller of the position of the switch associated with the third randomly selected position;
   comparing an indication of the third randomly selected position stored in memory with the third indication of the position from the controller; and
   initiate a fourth action in response to the comparison associated with the third randomly selected position.

20. The system of claim 19 wherein the fourth action comprises authenticating the controller.

21. The system of claim 14 wherein the web server and the user interact with the controller and the web-enabled device to authenticate the controller through a series of actions.

22. The system of claim 21 wherein the series of actions are repeated for a determined number of times to authenticate the controller.

23. The system of claim 21 wherein the series of actions includes steps (i)-(v).

24. The system of claim 14 wherein steps (i)-(v) are repeated for a number of times to authenticate the controller.

* * * * *